United States Patent
Sopper et al.

(10) Patent No.: US 10,301,024 B1
(45) Date of Patent: May 28, 2019

(54) AERODYNAMIC PACKAGE

(71) Applicant: Wing Aviation LLC, Mountain View, CA (US)

(72) Inventors: Clark Sopper, Redwood City, CA (US); Adam Woodworth, Santa Clara, CA (US)

(73) Assignee: Wing Aviation LLC, Mountain View, CA (US)

( * ) Notice: Subject to any disclaimer, the term of this patent is extended or adjusted under 35 U.S.C. 154(b) by 537 days.

(21) Appl. No.: 14/998,303

(22) Filed: Dec. 24, 2015

(51) Int. Cl.
| | | |
|---|---|---|
| B64C 1/22 | (2006.01) |
| B65D 75/04 | (2006.01) |
| B64D 9/00 | (2006.01) |
| B64C 39/02 | (2006.01) |
| B65D 75/58 | (2006.01) |
| B64D 1/22 | (2006.01) |

(52) U.S. Cl.
CPC ............ B64D 9/00 (2013.01); B64C 39/024 (2013.01); B64D 1/22 (2013.01); B65D 75/04 (2013.01); B65D 75/58 (2013.01); *B64C 2201/128* (2013.01)

(58) Field of Classification Search
CPC ......... B65D 75/04; B65D 75/14; B65D 75/26
See application file for complete search history.

(56) References Cited

U.S. PATENT DOCUMENTS

| | | | |
|---|---|---|---|
| 2,804,258 A | * | 8/1957 | Petter .................... B65D 75/14 229/87.11 |
| 3,114,643 A | * | 12/1963 | Boston ................... B65D 75/26 206/484.2 |
| 3,730,418 A | * | 5/1973 | Spencer ................ B65D 5/4295 119/497 |
| 5,779,052 A | | 7/1998 | Woodford et al. |
| 6,676,009 B1 | | 1/2004 | Rose |
| 8,979,030 B2 | | 3/2015 | Potter et al. |
| 2015/0291298 A1 | | 10/2015 | Potter et al. |
| 2017/0106978 A1 | * | 4/2017 | Sopper ..................... B65D 5/18 |
| 2017/0267348 A1 | * | 9/2017 | Sweeny .................. B64C 25/58 |

FOREIGN PATENT DOCUMENTS

WO  WO-2011102235 A1 *  8/2011  ............. A47K 10/46

OTHER PUBLICATIONS

U.S. Appl. No. 62/243,065, filed Oct. 17, 2015 entitled "Aerodynamic Tote Package".

* cited by examiner

*Primary Examiner* — Brian M O'Hara
(74) *Attorney, Agent, or Firm* — McDonnell Boehnen Hulbert & Berghoff LLP

(57) ABSTRACT

An example package is disclosed for carrying a load external to a UAV. The package may be generated by folding a sheet of material and include a cavity formed by a top surface section, a bottom surface section, a first side surface section, a second side surface section, a leading edge section, and a trailing edge section of the sheet. The top surface section may include an attachment feature for attaching the package to the UAV. The leading edge section may include leading edge surfaces formed from folds along creases of the sheet to define a front end of the cavity and deflect airflow over a top surface and under a bottom surface of the package. The trailing edge section may include upper and lower surfaces formed from folds along creases and extend from the top and bottom surfaces to intersect and define a back end of the cavity.

20 Claims, 17 Drawing Sheets

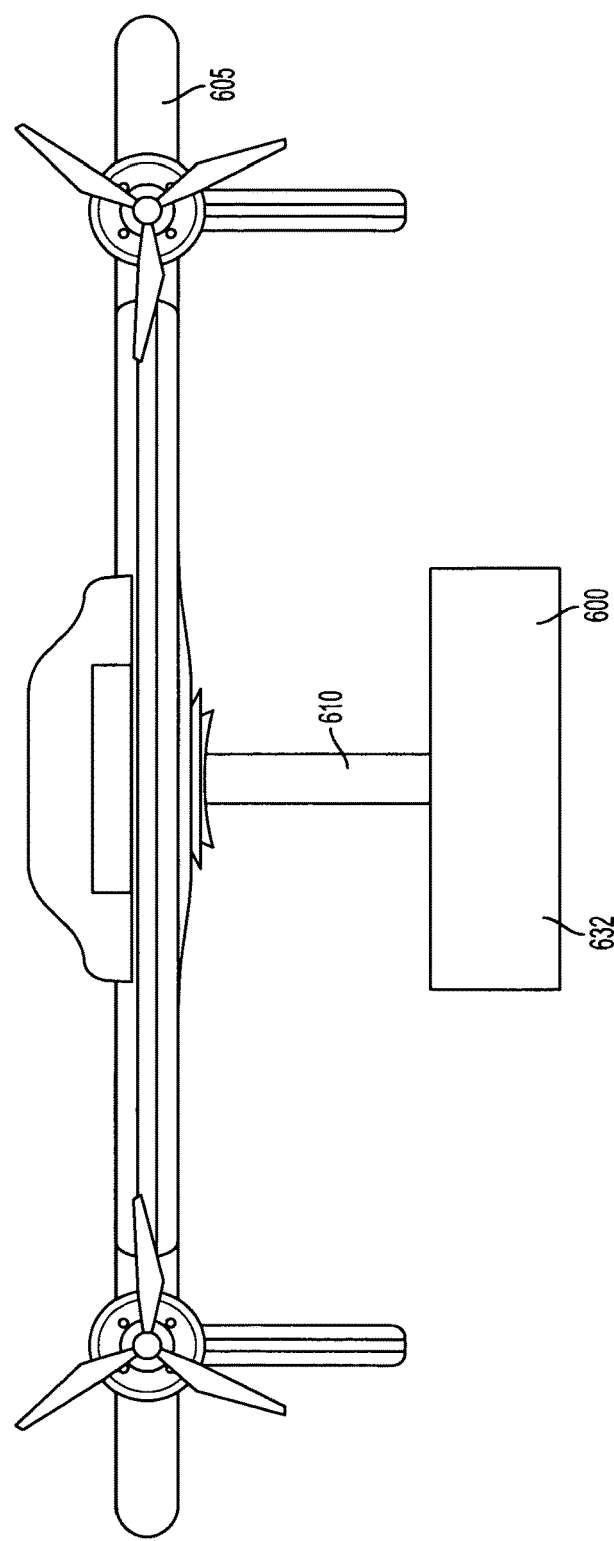

AERODYNAMIC PACKAGE

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter unmanned aerial vehicles (UAVs), among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be useful for many applications. For example, UAVs may be helpful for delivering objects. Several factors may affect the quality of the delivery of items by UAV. One factor may be the design of packaging containing the items delivered by a UAV. Thus, improvements in the design of packaging may improve delivery of objects by a UAV.

SUMMARY

Example systems and methods may be provided for a package that can be generated by folding a sheet of material to create an aerodynamic package. The package may be attached externally to a UAV to deliver goods external to the UAV. The package may have a leading edge portion configured to reduce drag for a range of angles of attack, or a leading edge portion configured to reduce drag for a fixed angle of attack. The package may include trailing edge surfaces that change planes at an angle below 15° to maintain attached airflow around the package. The package may include a perforated tab that can be detached from a perforated edge to open the package.

In a first aspect, a package that is attached to an unmanned aerial vehicle (UAV) and formed from a foldable sheet of material, the package including a cavity formed by at least a top surface section, a bottom surface section, a first side surface section, a second side surface section, a leading edge section, and a trailing edge section of the foldable sheet, wherein the leading edge section comprises one or more leading edge surfaces formed from folds along one or more creases of the foldable sheet to define a front end of the cavity and deflect airflow over a top surface of the package and under a bottom surface of the package during flight of the UAV, wherein the trailing edge section comprises a trailing edge upper surface and a trailing edge lower surface formed from folds along the one or more creases of the foldable sheet, wherein the trailing edge surfaces extend from the top surface and bottom surface of the package and intersect to define a back end of the cavity; and an attachment feature arranged on the top surface section of the foldable sheet.

In a second aspect, a sheet of material foldable to form a package that attaches to an unmanned aerial vehicle (UAV), the sheet of material including a top surface section foldable to form a top of a cavity of the package, the top surface section including an attachment feature; a bottom surface section foldable to form a bottom of the cavity; a first side surface section foldable to form a first side of the cavity and a second side surface section foldable to form a second side of the cavity; a leading edge section comprising one or more leading edge surfaces formed from folds along one or more creases of the foldable sheet to define a front end of the cavity and deflect airflow over a top surface of the package and a under a bottom surface of the package; and a trailing edge section comprising a trailing edge upper surface and a trailing edge lower surface formed from folds along the one or more creases of the foldable sheet, wherein the trailing edge surfaces extend from the top surface and bottom surface of the package and intersect to define a back end of the cavity.

In a third aspect, a method for manufacturing a package to attach to an unmanned aerial vehicle (UAV) comprising cutting a flat shape from a single sheet of material; excising a hole from the flat shape to define an attachment feature; creasing the sheet to define a plurality of creases; perforating one or more creases that define a perforated tab when the sheet is folded; folding the sheet at the plurality of creases to define a top, a bottom, a first side, and a second side of a cavity of the package; folding the sheet at the plurality of creases to define a front end of the cavity by forming leading edge surfaces that deflect airflow over a top surface of the package and under a bottom surface of the package; folding the sheet at the plurality of creases to define a back end of the cavity by forming a trailing edge upper surface and a trailing edge lower surface, wherein the trailing edge surfaces extend from the top and bottom surfaces of the package to intersect at the perforated tab; and sealing a side surface to the bottom surface of the package, one of the leading edge surfaces to the bottom surface, and the trailing edge upper surface to the trailing edge lower surface.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIGS. 6A and 6B illustrate various views of a package connected to an unmanned aerial vehicle, according to an example embodiment.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Unmanned aerial vehicles (UAVs) may be used for various purposes, including transporting packages or packages containing goods to a delivery site. While some UAVs may transport packages within the aircraft, other UAVs may transport packages outside of the aircraft. In particular, transporting packages outside of the aircraft may be more efficient. However, transporting packages external to a UAV aircraft may present a few challenges.

In one respect, a package that is carried by a UAV should be able to protect its contents from the environment, including hot or cold temperatures, moisture, dirt, insects, impact, and/or other objects of the environment. Further, a package carried by a UAV will typically have aerodynamic drag that can slow and/or reduce the efficiency of a UAV during flight. The additional drag resulting from a package can make delivery of the package inefficient and expensive; e.g., due to higher fuel costs. Additionally, it may be desirable to attach the package to the UAV in a manner that reduces the amount of shifting of package contents during flight. The attachment and shifting of the package may affect the flight dynamics of the UAV. Accordingly, a device is described that may help to address these and/or other challenges.

Figure 6B:
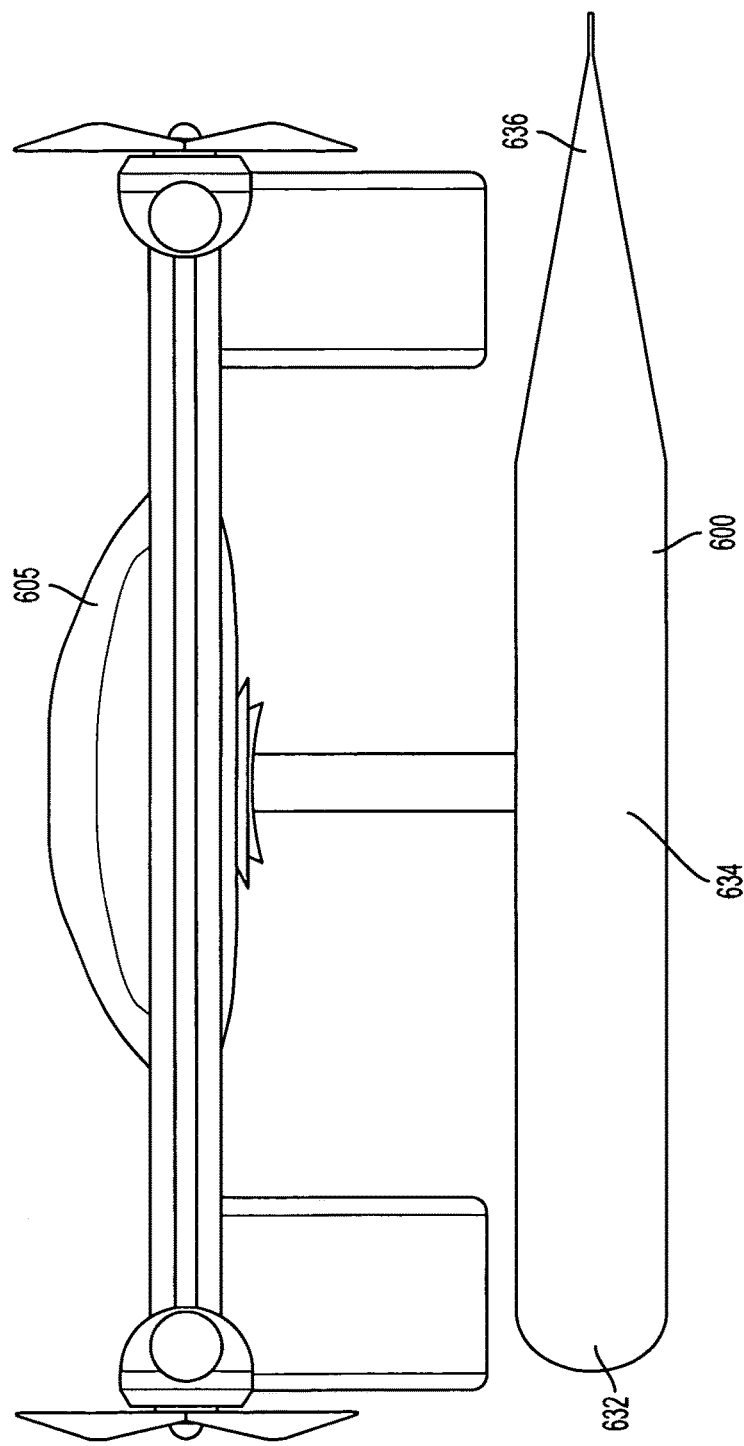
Figure 6C:
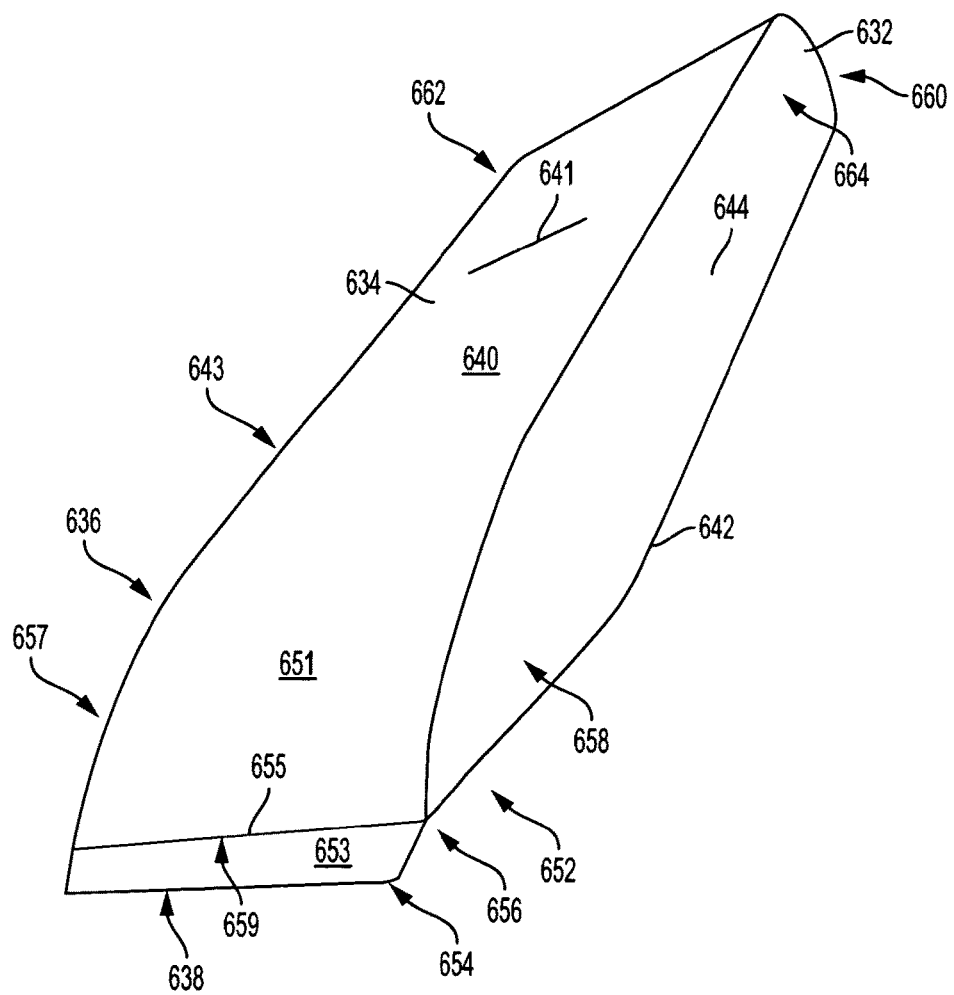
FIG. 6C illustrates a perspective view of a package, according to an example embodiment.
Figure 7:
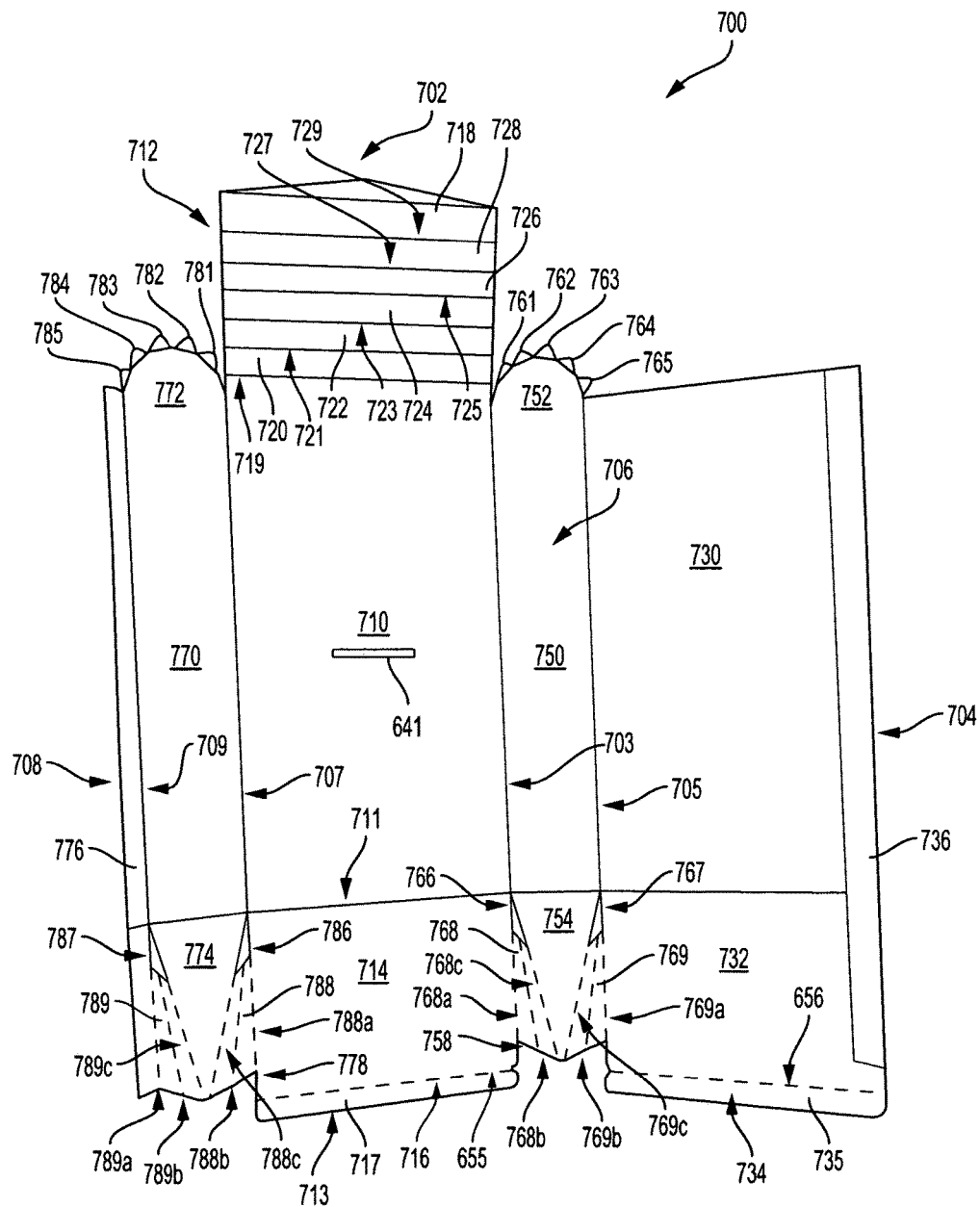
FIG. 7 illustrates a top view of a sheet of material, according to an example embodiment.

Referring to FIGS. 6C and 7, an example package may be formed from a sheet of material 700 configured to fold into the shape of a package 600, which is configured for external attachment to the underside of a UAV. The sheet of material 700 may include a top surface section 710, a bottom surface section 730, a first side surface section 750, a second side surface section 770, a leading edge section 712, and a trailing edge section 714 that generate a package 600 containing a cavity when the sheet of material 700 is folded. The top and bottom surface sections 710 and 730 may correspond with the top and bottom surfaces 640 and 642, respectively, of the package 600, while the first and second side surface sections 750 and 770 may correspond with the first and second sides 643 and 644, respectively, of the package 600. The leading edge and trailing edge sections 712 and 714 may be folded at one or more creases to generate leading edge surfaces (e.g., 720, 722, 724, 726, and 728) of the package that define the front end of the cavity and trailing edge surfaces (e.g., 651 and 652) of the package that define the back end of the cavity.

The leading edge portion 632 of the package 600 may be designed to be aerodynamic in a range of attack angles. In particular, the leading edge portion may be rounded and protrude from a front end of the cavity of the package 600. The rounded, protruding leading edge portion 632 design may allow the leading edge portion to be aerodynamic at a range of attack angles. Alternatively, the leading edge portion 632 could have a pointed design protruding from the front end of the cavity of the package 600. In this case, the leading edge portion 632 may be aerodynamic for a smaller range of, or a particular, attack angle. Thus, a rounded leading edge portion 632 may be used when the attack angle of the leading edge portion 632 may fall within a range of attack angles. Alternatively, a pointed leading edge portion 632 may be used when the attack angle of the leading edge portion 632 is known.

The trailing edge portion 636 of the package may be defined by a trailing edge upper surface 651 and a trailing edge lower surface 652 that extend from the top and bottom surfaces 640 and 642, respectively, of the package 600 to define the back end of the cavity and intersect. Each of the trailing edge surfaces 651 and 652 may extend from the top and bottom surfaces 640 and 642 of the package at an angle to intersect. The surfaces 651 and 652 may extend at an angle less than or equal to 15° to ensure that airflow around the package 600 remains attached. This design allows for a more aerodynamic package that reduces drag.

The upper and lower trailing edge surfaces 651 and 652 may be sealed at their intersection to close the package 600. Furthermore, the intersection of the upper and lower surfaces 651 and 652 of the trailing edge may include a perforated tab 638 to ease opening of the package 600. In particular, a recipient of the package 600 may detach at the perforated edge 659 the perforated tab 638. Thus, the upper and lower trailing edge surfaces 651 and 652 may be connected to close the package 600 and create an aerodynamic trailing edge portion 636 while also creating a perforated tab 638 that can be detached by a recipient to open the package 600.

A single sheet of material 700 may be folded to create the package 600 without requiring any additional expensive tools. The sheet of material 700 may fold flat, making storage and transportation more cost efficient. The material may be paper, paperboard, fiberboard, or some other material used for creating packages. Thus, the cost of creating the package 600 may be low enough to make it more efficient to leave the package 600 at the delivery site. As a result, the return flight of the UAV after delivery of the package 600 is more efficient with lower fuel costs because the UAV does not need to return an empty package 600 to the shipper.

Additionally, the outer mold line of the package may create less drag than a traditional rectangular box. Once the sheet of material 700 is folded, the resulting package 600 features smooth surfaces with a rounded (or pointed) front that reduces the frontal cross-sectional area. These designed features reduce the drag on the UAV and package system. Furthermore, because the package 600 is created by folding a single sheet of material 700, the package 600 is less likely to have air gaps and/or excessive material (which add drag) resulting from connecting multiple sheets of material.

II. Illustrative Unmanned Vehicles

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

Figure 1:
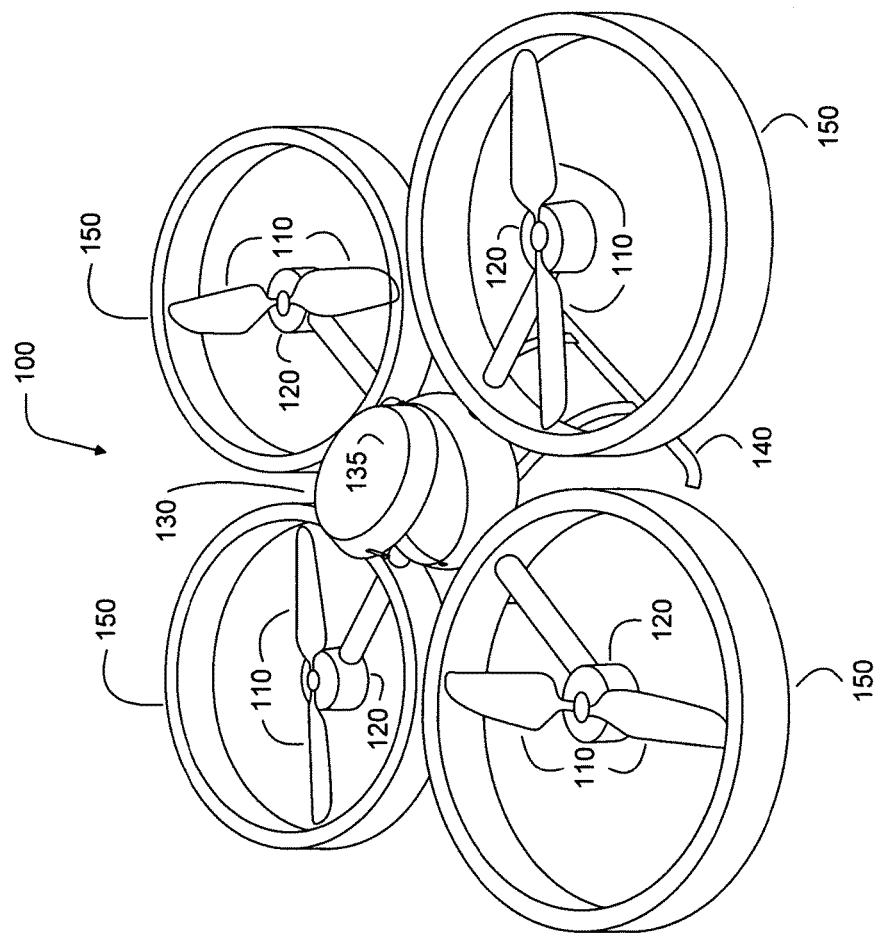
FIGS. 1, 2, 3A, and 3B are simplified illustrations of unmanned aerial vehicles, according to example embodiments.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself by adjusting the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
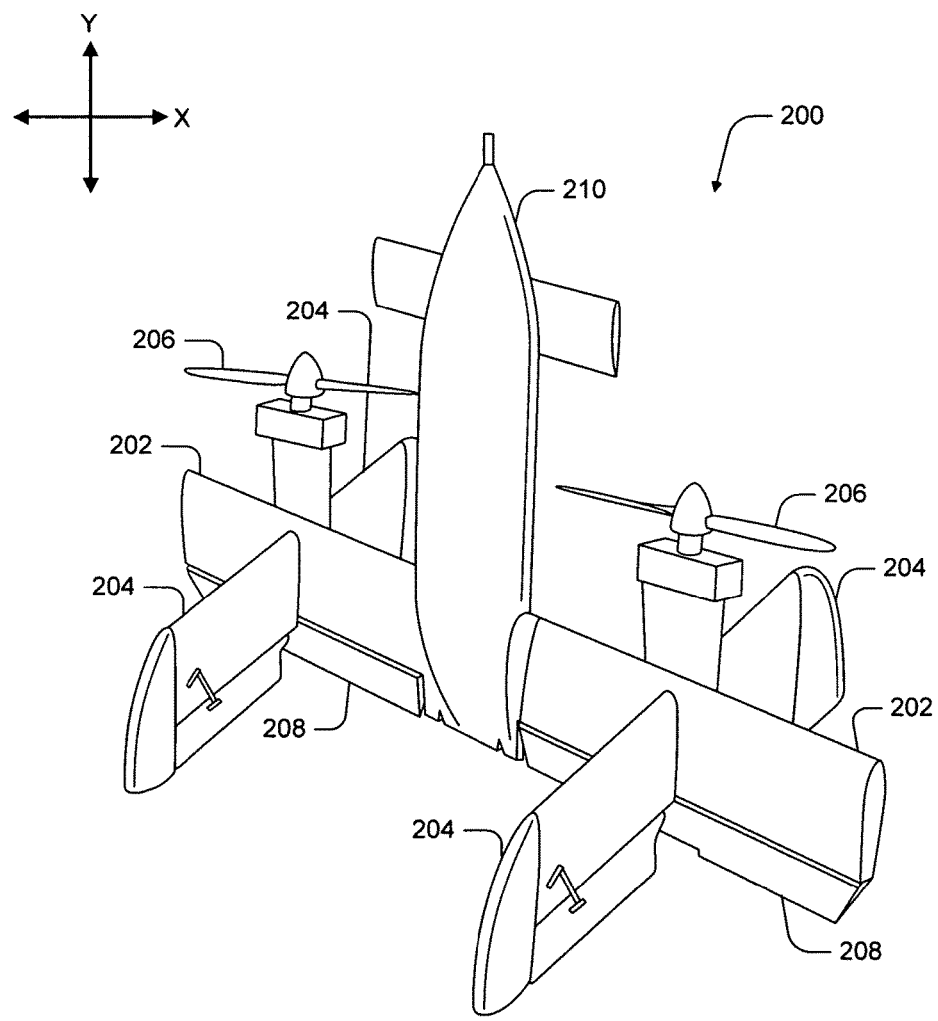

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
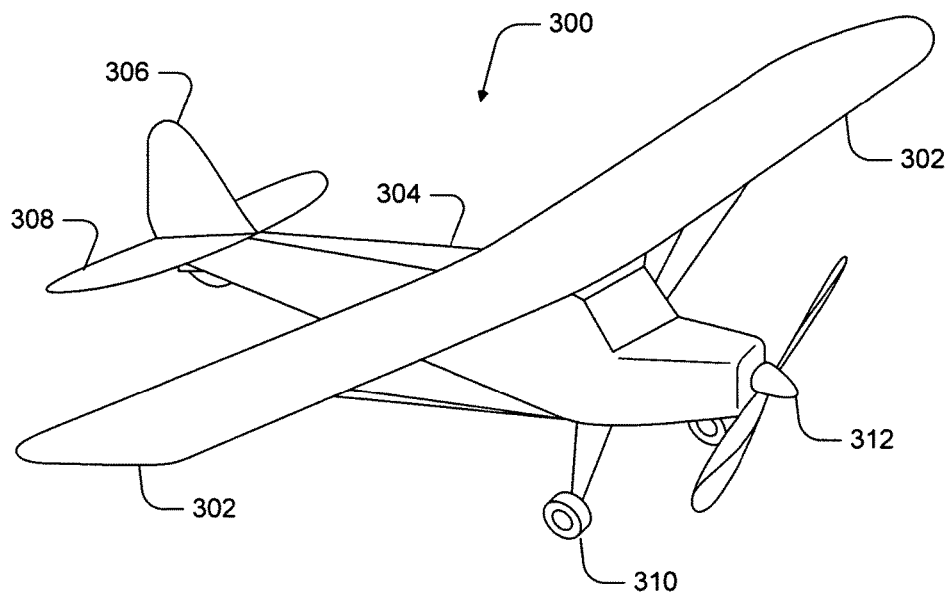

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
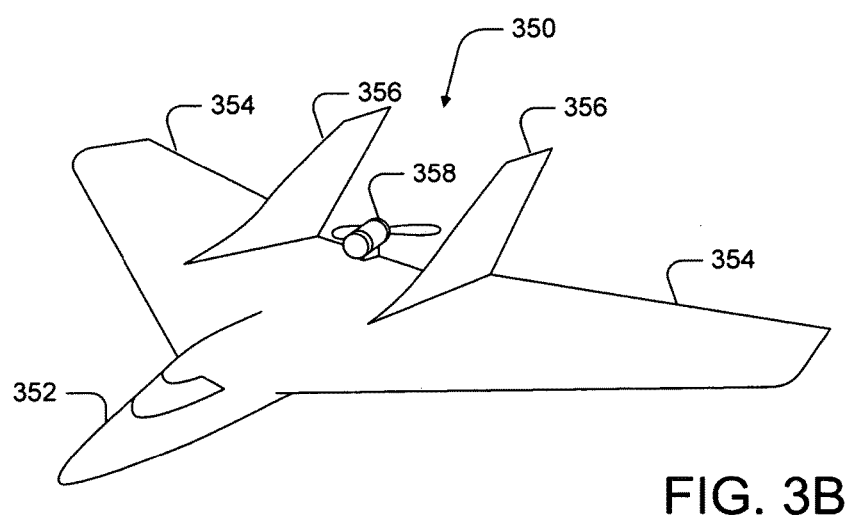

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller. Any one of the aircrafts 100, 200, 300, 350, or other aircrafts, may be used to deliver package 600 (see FIG. 6A).

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide services such as delivery services, remote medical support, and so on. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. Illustrative UAV Systems

Figure 4:
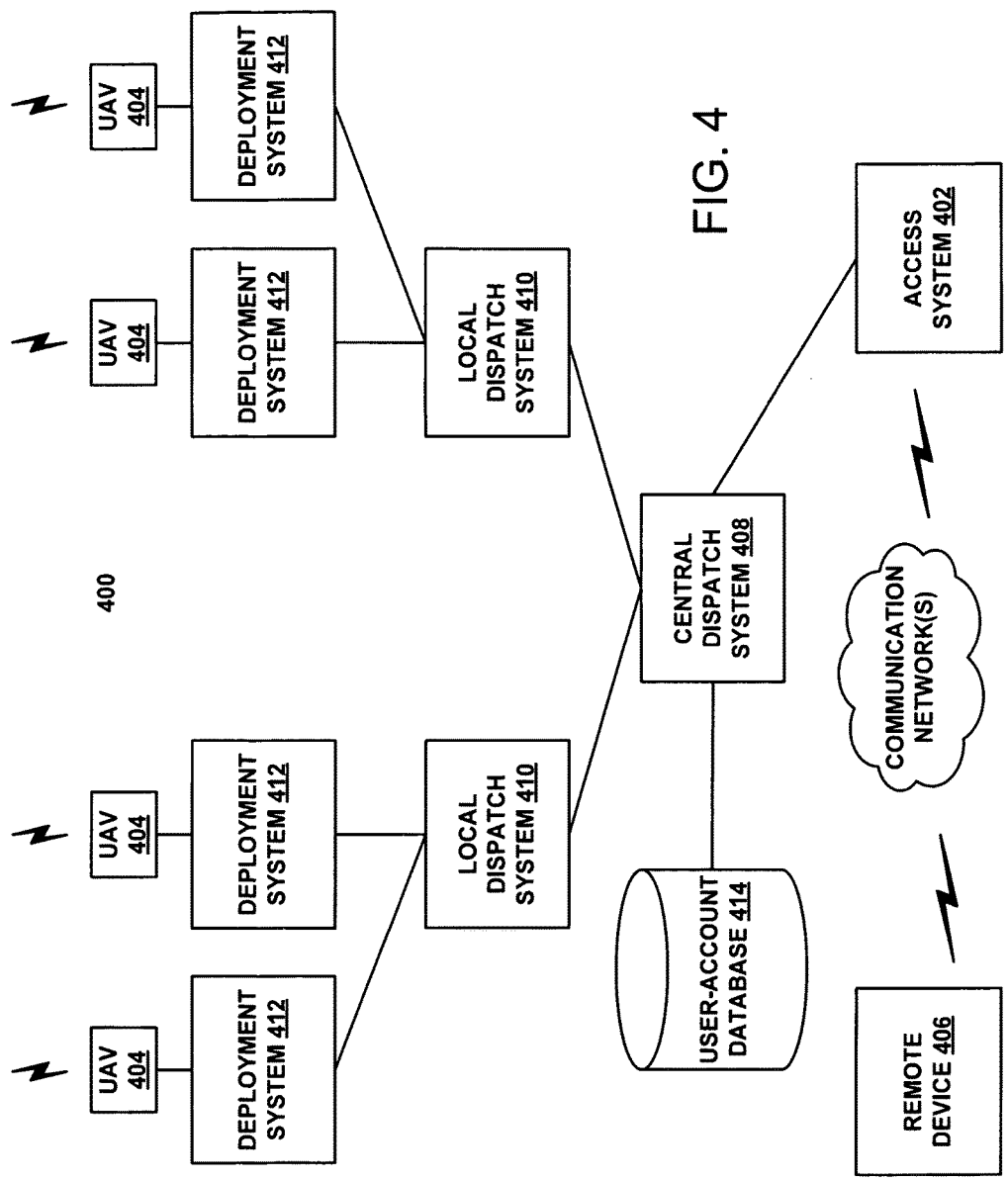
FIG. 4 is a simplified block diagram illustrating a network of unmanned aerial vehicles, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 4 is a simplified block diagram illustrating a distributed UAV system 400, according to an example embodiment.

In an illustrative UAV system 400, an access system 402 may allow for interaction with, control of, and/or utilization of a network of UAVs 404. In some embodiments, an access system 402 may be a computing system that allows for human-controlled dispatch of UAVs 404. As such, the control system may include or otherwise provide a user interface (UI) via which a user can access and/or control UAVs 404. In some embodiments, dispatch of UAVs 404 may additionally or alternatively be accomplished via one or more automated processes.

Further, an access system 402 may provide for remote operation of a UAV. For instance, an access system 402 may allow an operator to control the flight of a UAV via user interface (UI). As a specific example, an operator may use an access system to dispatch a UAV 404 to deliver a package to a target location, or to travel to the location of a medical situation with medical-support items. The UAV 404 may then autonomously navigate to the general area of the target location. At this point, the operator may use the access system 402 to take over control of the UAV 404, and navigate the UAV to the target location (e.g., to a particular person to whom a package is being sent). Other examples of remote operation of a UAV are also possible.

In an illustrative embodiment, UAVs 404 may take various forms. For example, each UAV 404 may be a UAV such as those illustrated in FIGS. 1, 2, 3A, and 3B. However, UAV system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for delivering different types of packages (such as package 600 from FIG. 6A).

A remote device 406 may take various forms. Generally, a remote device 406 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Other types of remote devices are also possible.

Further, a remote device 406 may be configured to communicate with access system 402 via one or more types of communication network(s). For example, a remote device 406 could communicate with access system 402 (or via a human operator of the access system) by placing a phone call over a POTS network, a cellular network, and/or a data network such as the Internet. Other types of networks may also be utilized.

In some embodiments, a remote device 406 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 400 may receive location information (e.g., GPS coordinates, etc.) from the user's mobile phone, or any other device on the user's person, such that a UAV can navigate to the user's location (as indicated by their mobile phone). Remote device 406 may be configured to allow a user to request other items (such as medical support).

A remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs to various target locations. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations each of the UAVs 404 is configured for (in the event that a UAV fleet includes multiple types of UAVs configured for different services and/or operations). Additionally or alternatively, each local dispatch system 410 may be configured to track which of its associated UAVs 404 are currently available for deployment and/or which services or operations each of its associated UAVs is configured for.

In some cases, when central dispatch system 408 receives a request for UAV-related service from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410.

In an example configuration, a local dispatch system 410 may be implemented in a computing system at the same location as the deployment system or systems 412 that it controls. For example, in some embodiments, a local dispatch system 410 could be implemented by a computing system at a building (such as a shipping facility, a fire station, etc.) where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of UAV system 400 are possible. For example, in some embodiments, a user of a remote device 406 could make a request (for package delivery, medical support, etc.) directly from a central dispatch system 408. To do so, an application may be implemented on a remote device 406 that allows the user to provide information regarding a requested service, and generate and send a data message to request that the UAV system provide the service. In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Such a launch system may include features that allow for a human-assisted UAV launch and/or features that provide for an automated UAV launch. Further, a deployment system 412 may be configured to launch one particular UAV 404, or to launch multiple UAVs 404.

A deployment system 412 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 400 may include or have access to a user-account database 414. The user-account database 414 may include data for a number of user-accounts, and which are each associated with one or more person. For a given user-account, the user-account database 414 may include data related to or useful in providing UAV-related services. Typically, the user data associated with each user-account is optionally provided by an associated user and/or is collected with the associated user's permission.

Further, in some embodiments, a person may have to register for a user-account with the UAV system 400 in order to use or be provided with UAV-related services by the UAVs 404 of UAV system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of UAV system 400. For example, when a person uses an associated mobile phone to, for example, place a call to an operator of access system 402 or send a message requesting a UAV-related service to a dispatch system, the phone may be identified via a unique device identification number, and the call or message may then be attributed to the associated user-account. Other examples are also possible.

IV. Illustrative Components of a UAV

Figure 5:
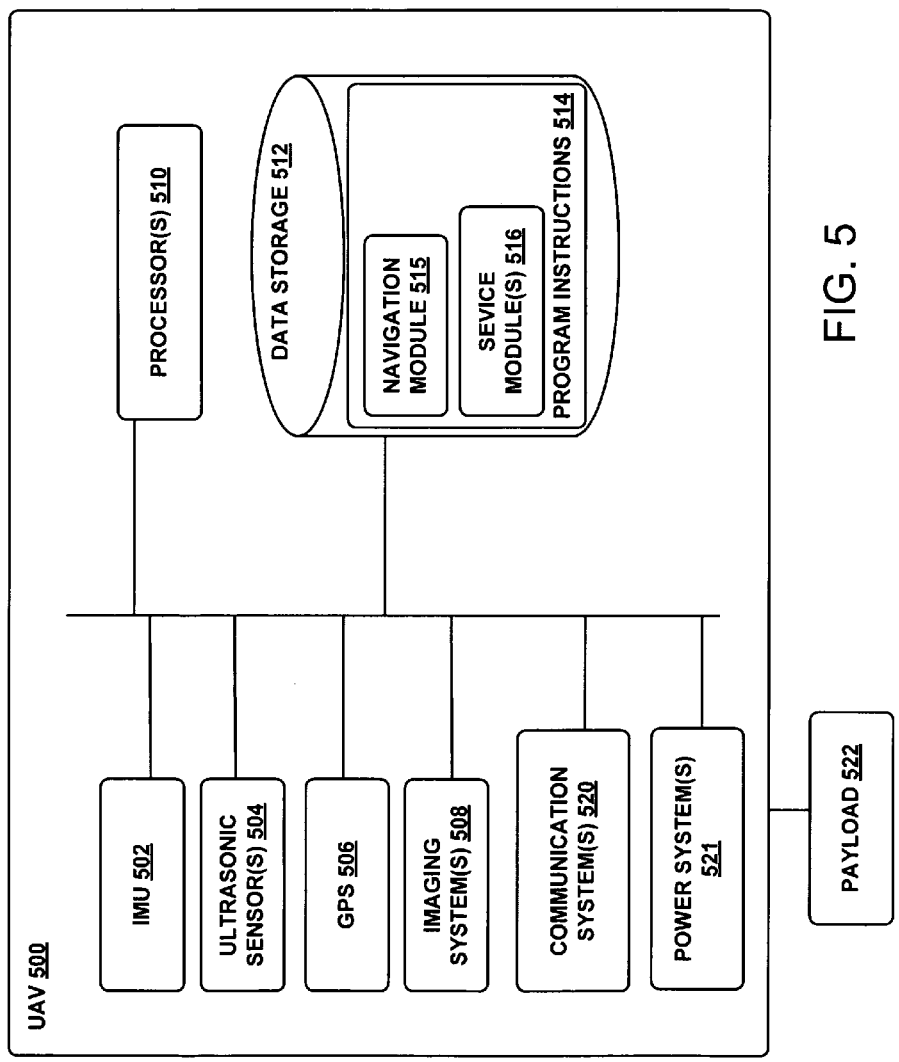
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more service modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device. Other examples are also possible.

UAV 500 may also include one or more imaging system (s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to navigate more precisely. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a general area, and then use a more-refined location-determination technique to identify and/or navigate to the target location within the general area.

For example, a UAV 500 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, a UAV may carry a package somewhere near a person, or within reach of the person, so that the person can take items from the package. However, a GPS signal may only get a UAV so far, e.g., to a stadium, a large building, a large farm, etc. A more precise location-determination technique may then be used to find the specific location of the person within the general area (.e.g., the stadium, large building, large farm, etc.).

Various types of location-determination techniques may be used to accomplish localization of a person or a device once a UAV 500 has navigated to the general area of the person or device. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of a target delivery location (or of a moving subject such as a person or their mobile device), the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 500 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "I'm over here!" to source the specific location of the person receiving the UAV delivery.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine latitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above to drop or lower an item or items to a package delivery site. The payload 522 may be a package 600 (see FIG. 6A) with an attachment feature 641 (see FIG. 6C) that attaches to the UAV and is delivered to a site and/or one or more person(s). Other examples are also possible.

F. Service Modules

As noted above, UAV 500 may include one or more service modules 916. The one or more service modules 516 include software, firmware, and/or hardware that may help to provide or assist in the provision of the UAV-related services.

Configured as such, a UAV 500 may provide various types of service. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to delivery, receipt, and/or opening of a package. The application may provide a text-based interface for the person to ask such questions, and then determine and provide answers to such questions. Other examples (such as medical support) are also possible.

V. Illustrative Package

FIGS. 6A and 6B display a package 600 attached to an aircraft 605. The package 600 may have a leading edge portion 632, a middle portion 634, and a trailing edge portion 636 configured to reduce drag during UAV flight. Additionally, the package 600 may be attached to pylon 610 attached to the aircraft 605. In some embodiments, more, fewer, and/or different components may be used to carry and deliver a package 600 using an aircraft 605.

Although aircraft 605 is shown as a UAV, other types of vehicles may be used to deliver the package 600, including aircrafts with one or more persons, other types of aircrafts, helicopters, boats, submarines, cars, trucks, and/or other vehicles. Although UAV 605 may be different from UAVs 100, 200, 300, and 350, in other embodiments, aircraft 605 may be similar to and/or the same as UAVs 100, 200, 300, and 350 described earlier. Further, one or more aircrafts 605 may be deployed by the various systems displayed and/or described in FIG. 4 to deliver packages, such as package 600. Additionally, aircraft 605 may include some or all of the components described in FIG. 5 for UAV 500.

In the displayed embodiments of FIGS. 6A and 6B, the package 600 can be used for the application of delivering a package with a UAV, such as UAV 605. Although a UAV can deliver a package that is stored within the UAV, it may be preferred, in some cases, to deliver a package that is located external to a UAV. By delivering a package, such as package 600, that is external to the UAV 605, the aircraft can improve efficiency by reducing fuel costs.

For example, a smaller UAV can be used because the UAV doesn't have to be large enough to contain the package 600 within the UAV 605. By using the smaller UAV, the fuel costs, transportation costs, and drag on the UAV may be reduced. Therefore, the efficiency of the delivery of the package may be improved. Using the package 600 to deliver goods external to a UAV can be useful for any application where efficiency is important. Thus, the package 600 may be used for short distance deliveries, long-distance deliveries, deliveries with different types of UAVs, or any type of delivery where fuel costs, costs of delivery, and/or efficiency are important.

The package 600 can be used in applications where the UAV 605 carries the package 600 to the delivery site, releases the package 600, and flies without the package to somewhere other than the delivery site (such as the original departure location, or some other location). Because the UAV can release the package with its contents, the UAV requires less fuel for flight after delivery than a UAV that merely releases the contents of the package and continues to fly with the empty package to another location (such as the original departure location, or some location other than the delivery site). Furthermore, dropping the package at the delivery site reduces the drag on the UAV-package system after the package has been released. Thus, the package 600 can also encourage efficient package delivery by being released at the delivery, site from the aircraft 605.

The package 600 is attached to the aircraft 605 at pylon 610, which may be part of the aircraft 605. The pylon 610 may allow for a rigid attachment of the package 600 to the aircraft 605 at a fixed point, such as at the pylon 610. The rigid attachment at a fixed point may prevent shifting of the package 600 and the contents within the package. Reducing shifting of the package and its contents may improve flight dynamics of the aircraft 605. Thus, the pylon 610 can improve flight dynamics of the aircraft 605 with the package 600, which may reduce fuel costs and improve efficiency of delivery of the package 600 by aircraft 605.

The pylon 610 may also improve flight dynamics of aircraft 605 by preventing the package 600 from creating an air shadow beneath aircraft 605. An air shadow beneath aircraft 605 may prevent airflow beneath the aircraft. As a result, the air shadow may reduce lift for the aircraft, which in turn may reduce the efficiency of the UAV flight. The package 600 may create an air shadow beneath aircraft 605 if the package 600 is attached below the aircraft 605 with a small vertical distance between the package 600 and the bottom of the aircraft 605. Because of the small vertical distance between the package 600 and the aircraft 605, air may be prevented from flowing beneath the aircraft 605, which in turn may reduce lift for the aircraft 605.

The narrow, long design of pylon 610, however, creates a larger, vertical distance (e.g., the height of the pylon 610) between the bottom of the aircraft 605 and the package 600 that allows air to flow beneath aircraft 605. As a result, the pylon 610 preserves lift for the aircraft 605 while the package 600 is attached to the aircraft 605. Thus, the pylon 610 can improve flight dynamics of the aircraft 605 by preventing the package 600 from creating an air shadow that would reduce lift for the aircraft 605 (or reducing the effect of such an air shadow).

In some embodiments, other types of attachment mechanisms may be used to attach the package 600 to the aircraft 605. Furthermore, in other embodiments, the attachment may be at multiple points of the aircraft 605 and/or package 600. Further, the attachment of the package 600 to the aircraft 605 may not be rigid, in some embodiments. Other examples of attaching the package 600 to the aircraft 605 are also possible.

The aircraft 605 may use a variety of systems and methods to release the package 600 from the aircraft 605 upon delivery of the package 600 to the delivery site. One example may include using a winch connected to the package 600. The attachment could be at a location aligned with the center of mass of the package 600. Alternatively, the attachment could be at multiple points of the package. For another example, the package 600 may be airdropped to a delivery site by the aircraft 605. A parachute may be attached to the package 600 and deployed during the airdrop. Other mechanisms for releasing the package 600 may be used.

FIG. 6C displays the package 600 in a folded, sealed, and assembled configuration. The package 600 may include a leading edge portion 632, a middle portion 634, and a trailing edge portion 636 that define a cavity of the package. The middle portion 634 may include a middle portion top surface 640, a middle portion bottom surface 642, a middle portion first side surface 643, and a middle portion second side surface 644 that define a top of the cavity, a bottom of the cavity, a first side of the cavity, and a second side of the cavity, respectively. The middle portion top surface 640 may include an attachment feature 641. The middle portion first side surface 643 may include a leading edge first side surface 662, while the middle portion second side surface 644 may include a leading edge second side surface 664.

The trailing edge portion 636 a trailing edge portion upper surface 651, a trailing edge portion lower surface 652, a trailing edge portion first side surface 657, and a trailing edge portion second side surface 658. The trailing edge portion upper surface 651 and the trailing edge portion lower surface 652 may intersect to generate the perforated tab 638. The perforated tab 638 may be detachable from the package 600 at a perforated edge 659. The perforated tab 638 may include a perforated tab upper surface 653 (which may be part of the trailing edge portion upper surface 651) and a perforated tab lower surface 654 (which may be part of the trailing edge portion lower surface 652). The perforated edge 659 may include a first perforated crease 655 and a second perforated crease 656. The leading edge portion 632 may define a front end of the cavity, while the trailing edge portion 636 may define a back end of the cavity. In other embodiments, the package 600 may have more, fewer, and/or different components than those described above and/or displayed in FIG. 6C.

The package 600 may have a more aerodynamic design than other packages to provide more efficient package delivery with the UAV when the package 600 is located external to the UAV. The design of the package 600 may improve UAV delivery of goods by reducing drag. The package 600 may reduce drag in several ways.

The package 600 may be designed to reduce drag incurred by the package, and thus the system of the UAV carrying the package. Drag may be the resistance force incurred by the package and/or vehicle during motion through a fluid (such as air for a UAV and an attached package in motion). Various factors can affect drag. In particular, smooth surfaces, fewer surfaces, and a lower amount of frontal cross-sectional area are design factors of the package that can reduce the drag incurred by a package and/or the vehicle. Other factors that may affect drag include speed, air gaps, excess material, the size of the vehicle, lift, and/or other factors.

A leading edge portion 632 with a rounded shape may help to reduce drag. The round shape may reduce the frontal cross-sectional area of the package 600, which may in turn reduce the amount of drag on the package 600. Alternatively, a pointed leading edge portion may reduce the frontal cross-sectional area of the portion 632, and thus reduce drag. A rounded leading edge portion 632 may efficiently reduce drag for a large range of angles of attack, while a pointed leading edge portion 632 may be more efficient at reducing drag for a smaller range of angles of attack, and/or a particular angle of attack. The angle of attack (i.e., attack angle) may be the angle between the direction of the velocity vector of the UAV-package system and the longitudinal axis of the package (such as the direction the package is pointing during UAV flight).

Thus, if the angle of attack of the package and/or UAV during UAV flight is known, a pointed leading edge portion may be a more efficient design than a rounded leading edge portion 632. Alternatively, if the package 600 may have a large range of angles of attack during UAV flight, then a rounded leading edge portion 632 may be more efficient than a pointed leading edge portion. In the displayed embodiment, the leading edge portion 632 of the package 600 is a rounded design to efficiently reduce drag for a range of angles of attack of the package 600 during UAV flight. Other designs of the leading edge portion may be possible (see FIGS. 9A and 9B).

Smooth surfaces of the package 600 may also help reduce drag. In particular, the leading edge portion 632, the middle portion 634, and the trailing edge portion 636 may all have smooth exterior surfaces along the package 600. Put differently, the surfaces for each portion may be mostly flat. Although the rounded leading edge portion 632 may not be flat, the exterior surfaces of the rounded leading edge portion 632 may be smooth. The smooth surfaces may lack concave surfaces, jagged edges, excess material, air gaps, and/or other material properties that may increase drag on the package 600. Additionally, folds and/or edges for portions 632, 634, and 636 may have little excess material and/or few air gaps present that may increase drag on the package 600. Furthermore, each of the portions 632, 634, and 636 may reduce the frontal cross-sectional area of the package 600, which in turn may lower the drag on the package 600.

Drag on the package 600 may be reduced by generating the package 600 from one sheet of material. The package 600 may be generated from one sheet of material (such as paper, paperboard, cardboard, corrugated fiberboard, and/or other materials for packages) by folding, connecting, and/or sealing sections of the sheet of material. Using one sheet of material helps ensure that an aerodynamic and watertight package 600 can be generated. In particular, creating a package out of multiple sheets may be prone to air gaps and/or excess material at locations where one sheet of material is connected to another sheet of material. Both air gaps and excess material can increase drag, while air gaps may prevent the package from being watertight. Thus, generating the package 600 from one sheet of material can ensure an aerodynamic and/or watertight design.

The trailing edge portion 636 may reduce drag on the package 600 by allowing airflow to remain attached to the package 600 during UAV flight. If the airflow separates from the trailing edge portion 636 (as opposed to remaining attached) during UAV flight, the drag on the package 600 may increase. One design that prevents airflow separation from the package 600 is to extend the surfaces of the trailing edge portion 636 from the middle portion 634 at a low angle to intersect at a perforated tab 638 and define a back end of a cavity of the package 600.

In the displayed embodiment, the trailing edge portion upper surface 651 extends from the middle portion top surface 640 at an angle less than or equal to 15°, while the trailing edge portion lower surface 652 extends from the middle portion bottom surface 642 at an angle that is also less than or equal to 15°. In some embodiments, the angle first surfaces 651 and 652 may be lower or higher than 15°.

Because the upper and lower surfaces 651 and 652, respectively, extend from the middle portion 634 of the package 600 at an angle less than or equal to 15°, the airflow over the trailing edge portion 636 remains attached. By designing the trailing edge portion 636 to prevent airflow separation from the package 600 during UAV flight, the trailing edge portion 636 reduces drag on the package 600 during UAV flight.

The trailing edge portion 636 may also include a trailing edge portion first side surface 657 and a trailing edge portion second side surface 658 designed to reduce drag on the package 600. The side surfaces 657 and 658 may be designed to have smooth, flat surfaces. In particular, the side surfaces 657 and 658 may be designed to have flat surfaces without excess material bunching up at the surface. Additionally, the surfaces 657 and 658 may be designed to be smooth and flat surfaces without concave features and/or air gaps that may add drag.

Drag on the UAV and package during delivery may be reduced by designing the package 600 to be left at the delivery site. The package 600 can be designed from less expensive materials (such as paper, paperboard, cardboard, corrugated fiberboard, and/or other inexpensive materials) to allow the UAV to release both the contents of the package and the package itself at the delivery site. This allows any subsequent flights of the UAV to proceed without the added weight, frontal cross-sectional area, and/or volume of the package. In this way, the package 600 further reduces the drag on the UAV during flight before and after the delivery, which further reduces fuel costs.

Also, leaving the package 600 at the delivery site may reduce drag on the UAV by permitting a smaller UAV to be used. In particular, the UAV requires less fuel to complete a round trip delivery (for example, from a first location to a delivery site, and back to the first location) because the UAV does not carry the package 600 on the second leg of the trip (for example, from the delivery site to the first location). Because the UAV requires less fuel, a smaller UAV can be used to transport the package 600. By using the smaller UAV, the drag incurred by a UAV delivering the package 600 is reduced. Thus, leaving the package 600 at the delivery site reduces the drag on the UAV package system in several ways.

The package 600 may include attachment feature 641 that enables more efficient UAV flight. The attachment feature 641 may allow the package 600 to be attached to the UAV 605 during delivery and released from the UAV 605 after delivery to the delivery site. In the displayed embodiments of FIGS. 6A and 6B, the package 600 is attached via attachment feature 641 to the pylon 610. By attaching the package 600 to the pylon 610 via attachment feature 641, UAV flight can occur without an air shadow being caused by package 600, which in turn improves the flight dynamics of the UAV 605 by preventing lift from being reduced. Thus, the attachment feature 641 (as well as the pylon 610) allows for more efficient UAV flight to deliver a package 600.

The package 600 may be rigidly mounted to the UAV 605 via the attachment feature 641 and the pylon 610 to improve flight dynamics of the UAV package system. By rigidly mounting the package 600 to the UAV 605, shifting of the package 600 and the package contents can be reduced during UAV flight. The shifting of the package 600 and/or the package contents during UAV flight may alter the center of mass of the package, and thus, the angle of attack of the package during UAV flight. If the angle of attack of the package 600 is changed during UAV flight, drag on the package 600 may be increased. Thus, rigid mounting of the package 600 to UAV 605 can prevent increases in drag on the package 600 by mitigating changes in the angle of attack of the package 600 during UAV flight.

The contents of the package 600 may be located anywhere within the cavity of the package 600. The contents may be located in the cavity such that the center of mass of the package 600 and its contents remains aligned with the attachment feature 641. Aligning the center of mass of the package 600 with the attachment feature 641 may allow the package 600 to maintain an angle of attack during UAV flight that reduces drag on the package 600.

In the displayed embodiments of FIGS. 6A-6C, the package 600 may be designed to not increase lift on the UAV 605 because increasing lift may increase drag on the UAV-package system. Further, the package 600 may be designed to not increase speed of the UAV 605 because increasing speed may increase drag on the UAV-package system. However, in other embodiments, the lift and/or the speed may be increased based on the design of the package 600.

Because the package 600 is left at the delivery site, low cost materials and affordable methods may be used for creating the package 600. Materials may include paper, cardboard, and/or other materials typically used to manufacture bags, boxes, packages, and/or other items for shipping. The package 600 may be folded by hand from a sheet of material 700 (see FIG. 7) and sealed using an adhesive (e.g., glue). Thus, the package 600 may be folded from the sheet of material without requiring the use of any additional, custom, and/or expensive tools. Alternatively, existing machines for making packages, boxes, bags, and/or other shipping materials may be used to create package 600.

For example, one or more entities (e.g., a package manufacturer, a package shipper, etc.) may perform one or more steps to manufacture the package 600. The steps may include cutting a sheet of material into a flat shape (such as the flat shape of the sheet of material 700 displayed in FIG. 7), cutting a hole from the flat shape to define the attachment feature 641, generating different types of folding assistance (e.g., creases, perforations, notches, lines, and/or other alterations or deformations of the sheet of material 700), folding the material 700 based on the generated folding assistance to generate the package 600, and/or sealing different surfaces of the material 700 to close and generate the package 600. One or more entities may perform one or more of these steps using existing machines designed for making packages, boxes, bags, and/or other shipping containers. Additionally, one or more of these steps may be performed by hand and/or with existing tools. In some embodiments, additional, custom, and/or expensive tools and machines may not be needed for the one or more entities to manufacture the package 600 from the sheet of material 700.

Furthermore, the sheet of material used to create package 600 may be flattened and stored for later use, which may reduce storage and transportation costs of the sheet. For example, the sheet of material can be cut into a flat shape that is then folded to create the package 600 (see the sheet 700 in FIG. 7). In another example, the sheet of material may be partially folded such that the leading edge portion 632 and the trailing edge portion 636 are unfolded and/or unsealed, while the middle portion 634 may be folded and/or sealed (see FIG. 8A). The partially folded sheet may be flattened such that the middle portion top surface 640 and the middle portion bottom surface 642 are pushed into the cavity of the package 600.

For both examples (the flat sheet 700 of FIG. 7 and a partially folded sheet of FIG. 8A that is flattened), a larger quantity of flat (or flattened) sheets may be stored in a given space because the flat (or flattened) sheets take up less volume than other sheets (such as folded, un-flattened sheets). Thus, more sheets of material can be stored (e.g., in a warehouse, a storage facility, a shipping facility, or some other storage space) and/or shipped (e.g., in a car, truck, van, plane, boat, or some other vehicle) due to the smaller volume of the flat (or flattened) sheets. Because the sheet of material 700 is flat and can be flattened when partially folded, storage and/or shipping of the sheet of material prior to use as a package 600 may be relatively inexpensive and efficient for an entity (such as a box manufacturer, a shipping company, etc.). Furthermore, costs of shipping and/or storage of the sheet of material 700 prior to use as a package 600 may be reduced.

Because the package 600 may be located external to the UAV 605 during flight, the package 600 may be designed to protect its contents from the outside environment. In particular, by using one sheet of material during folding and creation of the package 600, the package 600 may be watertight and have few air gaps. Additionally, the package may protect its contents from elements of the outside environment, including hot or cold temperature, moisture, dirt, insects, birds, objects, and or other items of the outside environment. The folded package 600 may be a rigid structure that is durable over a period of time.

The folded package 600 may be constructed out of various materials including paper, paperboard, or a stiffer material, such as corrugated fiberboard. Corrugated fiberboard may also provide thermal insulation to the contents of the package via airflow through the corrugations. Other materials may also be used to construct package 600.

The package may have more or fewer sides than the number of sides displayed in and/or described in the displayed embodiments. For example, in FIG. 6C, the package 600 shows four surfaces including a middle portion top surface 640, a middle portion bottom surface 642, a middle portion first side surface 643, and a middle portion second side surface 644. In some embodiments, the package 600 may have more or fewer surfaces than the four surfaces displayed in FIG. 6C. Furthermore, while the package 600 is displayed as including both the leading edge portion 632 and the trailing edge portion 636, in other embodiments, the package 600 may include only one of the portions 632 or 636. Other configurations of the package 600 are possible.

The package 600 may be sized to be larger or smaller depending on the contents of the package, and thus, may be scalable. If the package is sized larger (or smaller), the length of the package may be increased (or decreased) to alter the size. The length of the package 600 may represent the distance between the leading edge portion 632 and the trailing edge portion 636 of the package. By altering the length of the package (as opposed to the width or the height), the package size can be altered without modifying the frontal cross-sectional area of the package 600, which may have less of an effect on the drag on the package 600. Although the displayed embodiments show delivery of one package 600 for each UAV 605, in other embodiments, a UAV 605 may deliver multiple packages 600.

FIG. 7 displays a sheet of material 700 with one or more sections that are folded and/or sealed to create the package 600. The sheet 700 may include an upper section 702, a lower section 704, a first side section 706, and a second side section 708. The upper section 702 may include a top surface section 710, an upper section leading edge section 712, and an upper section trailing edge section 714. The lower section 704 may include a lower section bottom surface section 730 and a lower section trailing edge section 732. The first side section 706 may include a first side surface section 750 and a trailing edge first side surface section 754. The second side section 708 may include a second side surface section 770 and a trailing edge second side surface section 774. The sheet 700 may include more, fewer, and/or different sections than those displayed in FIG. 7.

The sheet 700 may include several creases that may serve as boundaries between sections of the sheet of material 700. The sheet 700 may include an upper section first crease 703 separating the upper section 702 and the first side section 706. The sheet 700 may also include a lower section first crease 705 separating the lower section 704 and the first side section 706. The sheet 700 may also include an upper section second crease 707 separating the upper section 702 and the second side section 708.

The sheet 700 may also include a sealing flap crease 709 that indicates a part of a sealing flap 776 that is part of the second side section 708. The sheet 700 may include a trailing edge section crease 711 that separates an upper section top surface section 710 from an upper section trailing edge section 714, a lower section bottom surface section 730 from a lower section trailing edge section 732, a first side surface section 750 from a trailing edge first side surface section 754, and a second side surface section 770 from a trailing edge second side surface section 774. The sheet 700 may also include a leading edge section crease 719 that separates an upper section top surface section 710 from an upper section leading edge section 712. The sheet 700 may include more, fewer, and/or different creases than those shown in FIG. 7.

The upper section top surface section 710 may include an attachment feature 641 that allows the package 600 to be attached to the UAV 605 during UAV flight. The section 710 may be bound by the upper section first crease 703, the upper section second crease 707, the trailing edge section crease 711, and the leading edge section crease 719. When the creases 703, 707, 711, and 719 are folded to generate the package 600, the section 710 may correspond to the top surface 640 of the middle portion 634 of the package 600 in FIG. 6C.

The lower section bottom surface section 730 may include part of a sealing section 736. The sealing section 736 may extend across crease 711 through sections 730 and 734 such that part of the sealing section 736 is within section 730 on one side of the trailing edge section crease 711, and the remaining part of sealing section 736 is within section 734 on the other side of crease 711. The bottom surface section 730 may be bound by the trailing edge section crease 711 and the lower section first crease 705. When the creases 705 and 711 are folded to generate the package 600, the section 730 may correspond to the bottom surface 642 of the middle portion 634 of the package 600 in FIG. 6C.

The first side surface section 750 may include a leading edge first side surface section 752 and triangle flaps 761, 762, 763, 764, and 765. The first side surface section 750 may be bound by the upper section first crease 703, the lower section first crease 705, and the trailing edge section crease 711. When sheet 700 is folded along creases 703, 705, and 711 to generate the package 600, the section 750 may correspond to the first side surface 643 of the middle portion 634 of the package 600 in FIG. 6C.

The second side surface section 770 may include a leading edge second side surface 772 and triangle flaps 781, 782, 783, 784, and a 785. Section 770 may also include part of a sealing flap 776 generated by folding along crease 709. The flap 776 may extend along crease 709 across crease 711 through sections 770 and 713 such that part of the flap 776 is within section 770 on one side of the trailing edge section crease 711, and the remaining part of the flap 776 is within section 713 on the other side of crease 711. A surface of the sealing flap 776 may adhere to a surface of the sealing section 736 to generate the middle portion 634 of the package 600. The second side surface section 770 may be bound by the upper section second crease 707, the sealing flap crease 709, and the trailing edge section crease 711. When the sheet of material is folded along creases 707, 709, and 711 to generate the package 600, the section 770 may correspond to the second side surface 644 of the middle portion 634 of the package 600 in FIG. 6C.

The leading edge section 712 may include leading edge surfaces 720, 722, 724, 726, and 728. The leading edge section 712 may also include the leading edge sealing surface 718. The leading edge section 712 may be bound by the leading edge section crease 719. In other words, the section of the sheet of material 700 that is separated from the upper section top surface section 710 when the leading edge section crease 719 is folded may correspond to the leading edge section 712. When the sheet of material 700 is folded along crease 719 to generate the package 600, the section 712 may correspond to the leading edge portion front surface 660 of the leading edge portion 632 of the package 600 in FIG. 6C.

The leading edge sealing surface 718 may be sealed to the lower section bottom surface section 730 during folding of the sheet 700 to generate the leading edge portion 632 of the package 600. In the displayed embodiments, the leading edge sealing surface 718 may be sealed to the lower section bottom surface section 730 using an adhesive. However, in other embodiments, other methods (mechanical fasteners, staples, tape, inserting tabs into holes, etc.) for connecting the leading edge sealing surface 718 to the lower section bottom surface section 730 may be used. The sheet of material 700 may be folded along a leading edge section crease 729 to generate the leading edge sealing surface 718.

In the displayed embodiments, the leading edge section 712 includes surfaces 720, 722, 724, 726, and 728. In other embodiments, the leading edge section 712 may include more or fewer leading edge surfaces. The leading edge section 712 also includes leading edge section creases 719, 721, 723, 725, 727, and 729 to generate the leading edge section surfaces. Each leading edge surface may be generated by folding the sheet 700 along two corresponding leading edge section creases.

For example, surface 720 may be generated by folding the sheet 700 along creases 719 and 721. For another example, surface 722 may be created by folding the sheet 700 along creases 721 and 723. Additionally, folding the sheet 700 along creases 723 and 725 may generate surface 724. Similarly, folding the sheet 700 along creases 725 and 727 may create surface 726. Also, folding the sheet 700 along creases 727 and 729 may create surface 728. When the sheet 700 is folded along creases 719, 721, 723, 725, 727, and 729, and the surface 718 is sealed to the section 730 to generate the package 600, the surfaces 720, 722, 724, 726, and 728 may correspond with the leading edge portion front surface 660 of the leading edge portion 632 of the package 600 in FIG. 6C. Additionally, the sheet 700 may be folded along the creases 719, 721, 723, 725, 727, and 729 to form the leading edge surfaces 720, 722, 724, 726, and 728 that define a rounded front end of the cavity of the package 600.

Each leading edge section surface (e.g., 720, 722, 724, 726, and 728) may correspond with a pair of triangle flaps. In particular one of the triangle flaps 761-765 and one of the triangle flaps 781-785 may correspond with a single leading edge surface. For example, triangle flaps 761 and 781 may correspond to leading edge surface 720, while triangle flaps 762 and 782 may correspond to surface 722. Similarly, triangle flaps 763 and 783 may correspond to leading edge surface 724, while triangle flaps 764 and 784 may correspond to surface 726. Additionally, triangle flaps 765 and 785 may correspond to leading edge surface 728.

The triangle flaps may be folded into the cavity of the package before the leading edge section 712 is folded. The triangle flaps may support the corresponding leading edge surface and prevent the leading edge section 712 from collapsing into the cavity of the package 600 after folding. In particular, the triangle flaps may prevent the leading edge portion front surface 660 from caving into the cavity of the package 600. Although flaps 761-765 and 781-785 are shown as triangles, in other embodiments, the flaps may be a different shape (squares, rectangles, semi-circles, etc.) that allows the flaps to be folded into the cavity to support the leading edge section 712.

In the displayed embodiments, the leading edge section 712 may have five leading edge surfaces (e.g., 720, 722, 724, 726, and 728) that cause the corresponding leading edge portion 632 to have a rounded leading edge portion front surface 660. The surface 660 may have a parabolic or egg-shaped rounded surface. In other embodiments, the leading edge section 712 may have more than five leading edge surfaces, which may result in a more rounded leading edge portion front surface 660 for a corresponding leading edge portion 632. In some embodiments, a more rounded leading edge portion front surface 660 having more than the five leading edge surfaces shown in FIG. 7 may be a fully rounded surface having a semi-circle shape.

Alternatively, the leading edge section 712 may have fewer than five leading edge surfaces to generate a less rounded leading edge portion front surface 660 for a corresponding leading edge portion 632. For example, a less rounded leading edge portion front surface 660 may have a parabolic or egg-shaped surface, as opposed to a semi-circle shaped surface. In some embodiments, a pointed leading edge portion front surface 660 for a corresponding leading edge portion 632 may be generated by only having two leading edge surfaces for a leading edge section 712 (see FIGS. 9A and 9B). Other leading edge portion designs may also be possible.

The leading edge side surface section 752 may be part of a corresponding first side surface section 750. Similarly, the leading edge side surface section 772 may be part of a corresponding second side surface section 770. The leading edge side surface section 752 may be bound by creases 703 and 705, while the section 772 may be bound by creases 707 and 709. Thus, when the sheet 700 is folded along creases 703 and 705 to generate the package 600, the section 752 may correspond to a leading edge portion first side surface 662 of the leading edge portion 632 of the package 600 in FIG. 6C. Similarly, when the sheet 700 is folded along creases 707 and 709 to generate the package 600, the section 772 may correspond to a leading edge portion second side surface 664 of the leading edge portion 632 of the package 600 in FIG. 6C.

The trailing edge section 713 may include the upper section trailing edge section 714, the lower section trailing edge section 732, the first side section trailing edge side surface section 754, and the second side section trailing edge side surface section 774. The trailing edge section 713 may be bound by the trailing edge crease 711, which may separate the trailing edge section 713 from section 710, 730, 750, and 770, which correspond to the middle portion 634 of the package 600. Thus, when the sheet 700 is folded along the crease 711, as well as other creases, to form the package 600, the trailing edge section 713 may correspond to the trailing edge portion 636 of the package 600.

The upper section trailing edge section 714 may include an upper section perforated edge section 716 indicated by a first perforated crease 655. The section 714 may be bound by an excess material crease 768a, another excess material crease 788a, and the trailing edge section crease 711. When the sheet of material 700 is folded along the creases 655, 711, 768a, and 788a to generate the package 600, the sections 714 and 716 may correspond to the trailing edge portion upper surface 651 and the perforated edge portion upper surface 653 of the trailing edge portion 636 of the package 600 in FIG. 6C.

The lower section trailing edge section 732 may include a lower section perforated edge section 734 indicated by a second perforated crease 656. The section 732 may be bound by an excess material crease 769a and a trailing edge section crease 711. When the sheet of material 700 is folded along the creases 656, 711, and 769a to generate the package 600, the sections 732 and 734 may correspond to the trailing edge portion lower surface 652 and the perforated edge portion lower surface 654 of the trailing edge portion 636 of the package 600 in FIG. 6C.

The upper section perforated edge section 716 may include an interior surface 717 that is sealed to the interior surface 735 of the lower section perforated edge section 734 to seal the trailing edge portion upper surface 651 to the trailing edge portion lower surface 652 and generate the perforated tab 638. The upper section perforated edge section 716 may be bound by the first perforated crease 655, while the lower section perforated edge section 734 may be bound by the second perforated crease 656. When the sheet of material 700 is folded along creases 655 and 656 to generate the package 600, the section 716 may correspond to the perforated edge portion upper surface 653, while the section 734 may correspond to the perforated edge portion lower surface 654.

The sections 716 and 734 may be sealed together at their respective interior surfaces 717 and 735 using an adhesive to generate the perforated tab 638 in FIG. 6C. In other embodiments, the sections 716 and 734 may be connected together using a different method (e.g., fasteners, staples, tape, tabs inserted into holes, etc.). The first and second perforated creases 655 and 656 may generate the perforated edge 659 of the package 600 in FIG. 6C. In particular, the perforated tab 638 can be detached from the package 600 at the perforated edge 659.

The trailing edge side surface sections 754 and 774 may be part of the trailing edge section 713. The trailing edge first side surface section 754 may be bound by creases 711, 768c, and 769c, while the trailing edge second side surface section 774 may be bound by creases 711, 788c, and 789c. When the sheet 700 is folded along creases 711, 768c, and 769c to form the package 600, the section 754 may correspond to the trailing edge portion first side surface 657 of the trailing edge portion 636 of the package 600 in FIG. 6C. Similarly, when the sheet 700 is folded along creases 711, 788c, and 789c to generate the package 600, the section 774 may correspond to the trailing edge portion second side surface 658 of the trailing edge portion 636 of the package 600 in FIG. 6C.

The trailing edge section 713 may include holes 766, 767, 786, and 787, as well as cuts 758 and 778. These holes and cuts may be made to ensure that the resulting trailing edge portion 636 of the package 600 from folding the sheet 700 has smooth, trailing edge portion side surfaces 657 and 658. In particular, the holes and cuts may ensure that excess material doesn't build up at the surfaces 657 and 658 after folding and sealing the sheet 700 to generate the trailing edge portion 636 of the package 600. Additionally, the holes and cuts may ensure that the trailing edge portion 636 doesn't have unintended air gaps when the sheet 700 is folded into the package 600. By preventing excess material and air gaps from being generated in the trailing edge portion 636, the holes 766, 767, 786, and 787, as well as the cuts 758 and 778 can reduce drag on the package 600.

The trailing edge section 713 may include excess material 768, 769, 788, and 789. The excess material may include corresponding excess material creases. For example, excess material 768 may include corresponding excess material creases 768a, 768b, and 768c, while excess material 769 includes corresponding excess material creases 769a, 769b, and 769c. Additionally, excess material 788 may include corresponding excess material creases 788a, 788b, and 788c, while excess material 789 may include corresponding excess material creases 789a, 789b, and 789c. The excess material 768, 769, 788, and 789 may be folded along their corresponding excess material creases to prevent excess material from bunching up at the trailing edge portion side surfaces 657 and 658 when the sheet 700 is folded to generate the package 600. By preventing excess material from being exposed at surfaces 657 and 658, the excess material creases help reduce drag on the package 600.

Additionally, the sheet of material 700 may be symmetrical and allow for different parts of the material 700 to correspond to different portions of the package 600. For example, the sheet of material may be symmetrical along a longitudinal axis of the package 600 and sheet 700, such that the side sections 706 and 708 may correspond to any of the side surfaces on the package 600. For example, the first side surface section 750 could correspond to the middle portion second side surface 644 (instead of the middle portion first side surface 643) because the sheet of material 700 and the package 600 are symmetrical along the longitudinal axis of the package. Because the sheet of material 700 may be symmetrical, the sheet of material 700 may be folded in different directions along the creases to create the package 600.

Sheet 700 may include folding assistance in the form of creases 655, 656, 703, 705, 707, 709, 711, 719, 721, 723, 725, 727, 729, 768a, 768b, 768c, 769a, 769b, 769c, 788a, 788b, 788c, 789a, 789b, and 789c. Folding assistance may indicate where to fold the sheet of material 700 to form the package 600. Folding assistance may be provided with the sheet of material 700 to make folding easier by requiring less force to fold the material 700 along the creases. For example, crease 705 is provided to make a fold between sections 730 and 750 easier. Furthermore, each triangle flap may include a corresponding flap line (not displayed) to make folding of the corresponding triangle flap easier. Each flap line may be a crease, perforation, notch, or a line shown on the material to indicate where the flap may be folded.

Folding assistance can lead to a more aerodynamic construction of the package 600. In particular, easier folding may lead to better folds, which may result in less bunched up and/or excess material on the external surfaces of the package 600 after folding. As a result, the folded package 600 is more aerodynamic due to the better folds provided by the folding assistance (e.g., creases). In some cases, folding assistance (e.g., creases, perforations, etc.) may be straight lines to encourage straight bends when folding the material. Straight bends may also provide for better folds by reducing excess material that may build up around the fold when the bend isn't straight. Folding assistance may be provided as creases, perforations, perforated creases, notches, lines drawn on the sheet of material, and/or other alterations or deformations of the material 700 to indicate where to fold the material, and in some cases, ease folding of the material. Perforations of the material 700, notches, and/or other deformations of the material may be considered different types of creases.

Folding assistance may be provided as a combination of one or more of the aforementioned types of alterations or deformations of the material 700. For example, folding assistance may be provided as a combined crease and perforation. In other words, a part of the material that has a crease may be perforated at the same spot where the material is creased. Alternatively, folding assistance may include a section of material that is creased at one spot and perforated at a different spot. Other types of folding assistance may also be possible.

Figure 8A:
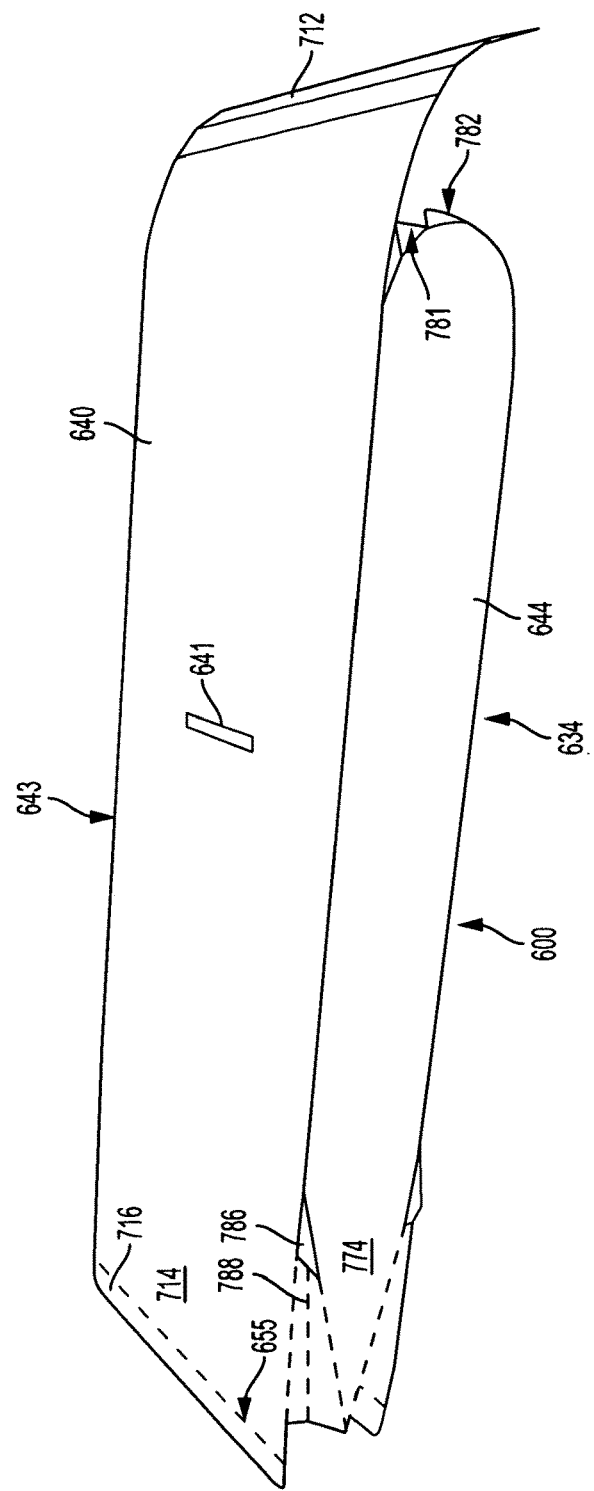
FIG. 8A illustrates a perspective view of a partially folded package, according to an example embodiment.

FIG. 8A displays a partially folded package 600. The package 600 includes folded middle portion 634, which includes a middle portion top surface 640, a middle portion first side surface 643, a middle portion second side surface 644, and an attachment feature 641. The partially folded package 600 also includes an unfolded leading edge section 712, triangle flaps 781 and 782, an upper section trailing edge section 714, an upper section perforated edge section 716, a first perforated crease 655, a trailing edge side surface section 774, a hole 786, and excess material 788. Thus, the middle portion 634 of the package 600 is folded and sealed, while the leading edge portion 632 and the trailing edge portion 636 are not completely folded and sealed.

The sheet 700 from FIG. 7 may be folded along creases 703, 705, 707, and 709 to generate the middle portion 634 of the package 600. Next, the sealing flap 776 may be folded along crease 709 and connected to sealing section 736 using an adhesive (e.g., glue or some other material to connect the flap to the section) to seal the middle portion 634 of the package 600. In other embodiments, the flap 776 may be connected to section 736 using some other method (fasteners, staples, tape, tabs inserted into holes, etc.).

The partially folded package 600 includes the unfolded leading edge section 712, which may have a rounded shape due to the multiple leading edge surfaces from FIG. 7 (not displayed in FIG. 6). Corresponding triangle flaps, such as triangle flaps 781 and 782, may be folded in towards the cavity of the package 600 before folding the leading edge section 712. The triangle flaps may provide support to the leading edge section 712 when the section is folded and sealed to a bottom surface of the package 600. The triangle flaps may prevent the folded and sealed leading edge section 712 from collapsing into the package 600 towards the cavity of the package 600.

After folding the triangle flaps, the leading edge section 712 may be folded along one or more leading edge section creases (e.g., 719, 721, 723, 725, 727, and/or 729) such that the leading edge sealing surface 718 can be connected to a bottom surface 642 (not displayed) of the middle portion 634 of the package 600. The bottom surface 642 may correspond to the bottom surface section 730 of the sheet 700. The sealing surface 718 may be connected to the bottom surface 642 using an adhesive (e.g., glue or some other material used for connecting surfaces). In other embodiments, the surface 718 may be connected to the bottom surface 642 (not displayed) using some other method (e.g., mechanical fasteners, staples, tape, tabs inserted into holes, etc.).

The partially folded package 600 of FIG. 8A also displays an unfolded trailing edge portion. The unfolded trailing edge portion includes an upper section trailing edge section 714, an upper section perforated edge section 716, a first perforated crease 655, a trailing edge side surface section 774, a hole 786, and excess material 788. In the displayed embodiment of FIG. 8A, the middle edge portion 634 may be folded and sealed first before folding and sealing the leading edge section 712 and the unfolded trailing edge portion. The leading edge section 712 may be folded and sealed before, after, or at the same or a similar time as when the unfolded trailing edge portion is folded and/or sealed. Folding and sealing the leading edge section 712 may generate the leading edge portion of the package 600.

Figure 8B:
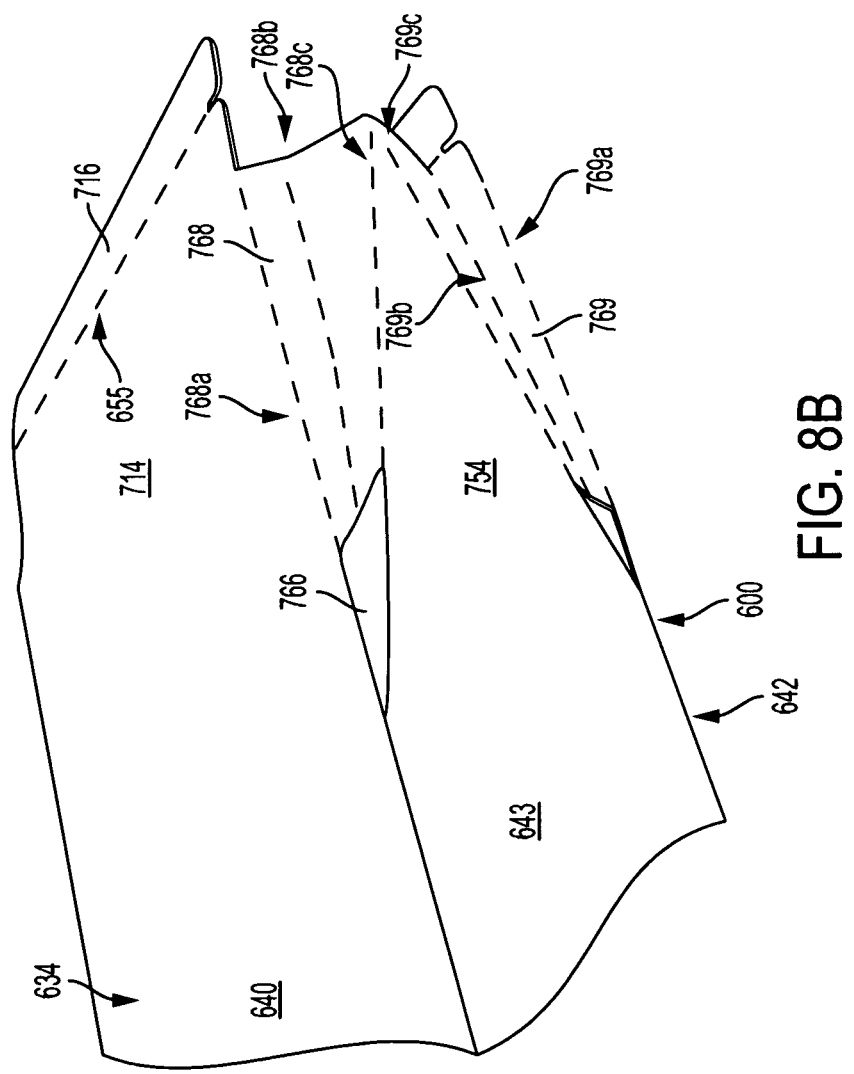
FIG. 8B illustrates a perspective view of a portion of a partially folded package, according to an example embodiment.

FIG. 8B displays an opposite side of the unfolded trailing edge portion of the partially folded package 600 from FIG. 8A. In FIG. 8B, the package 600 includes a middle portion 634, a middle portion top surface 640, a middle portion bottom surface 642, a middle portion side surface 643, an upper section trailing edge section 714, a first perforated crease 655, an upper section perforated edge section 716, a trailing edge first side surface section 754, a hole 766, excess material 768, excess material 769, excess material creases 768a, 768b, 768c, 769a, 769b, and 769c. The package 600 may include more, fewer, and/or different components than those displayed in FIG. 8B.

The trailing edge portion of the package 600 may be generated by folding the sheet of material 700 along various creases corresponding to the trailing edge portion 636 (see FIG. 6C), and sealing various sections of the sheet 700 corresponding to the trailing edge portion 636. In FIG. 8B, the unfolded trailing edge portion of the package 600 may be folded along excess material creases such that excess material is folded into the package towards the cavity of the package 600.

For example, the package 600 may be folded along excess material creases 768a, 768b, and 768c to push excess material 768 into the package 600. Similarly, the package 600 may be folded along excess material creases 769a, 769b, and 769c to push excess material 769 into the package 600. By folding the package 600 in this manner, the trailing edge side surface section 754 is visible in the folded package (see the trailing edge portion first side surface 657 in FIG. 6C) while the excess material 768 and 769 is not visible. Similar folds are made along excess material creases on the other side of the trailing edge portion of the package 600 to hide excess material.

By making folds along excess material creases, the trailing edge section upper and lower sections 714 and 732 (see FIG. 7) are brought together to intersect at a perforated edge section 716 and 734. After folding the package along the excess material creases, the package 600 may then be folded along the first and second perforated creases 655 and 656 (not displayed) such that the interior surfaces 717 and 735 (not displayed) of the perforated edge sections 716 and 734 are in contact. The perforated edge sections 716 and 734 (and thus the upper and lower sections 714 and 732) may then be connected by sealing the interior surfaces 717 and 735 together using an adhesive (e.g. glue or some other material for connecting surfaces). Alternatively, the perforated edge sections 716 and 734 may be connected using some other method (e.g., mechanical fasteners, staples, tape, tabs inserted into holes, etc.).

Figure 8C:
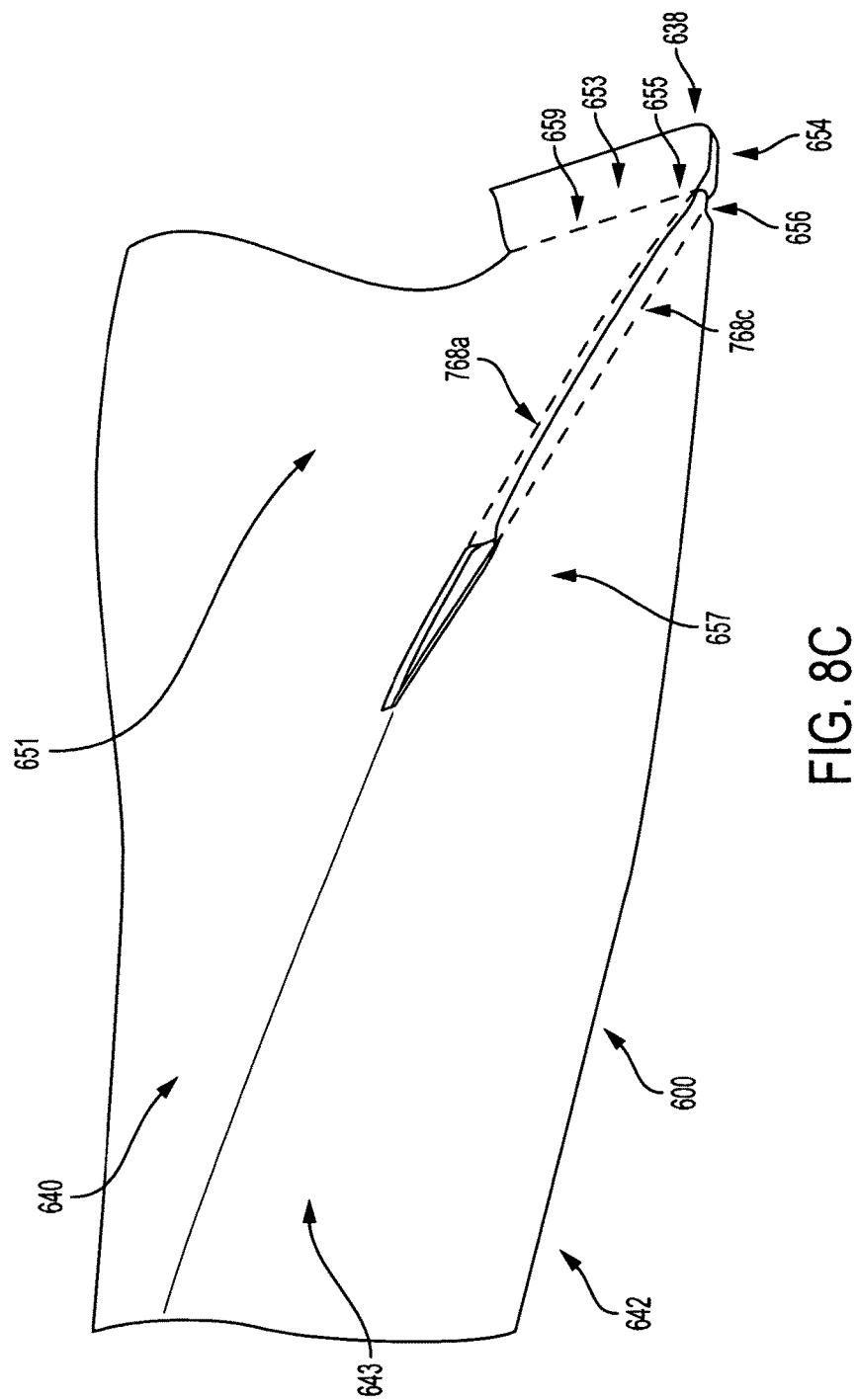
FIG. 8C illustrates a perspective view of a folded portion of a package, according to an example embodiment.

FIG. 8C displays a folded trailing edge portion of the package 600. In FIG. 8C, the folded trailing edge portion may include a trailing edge portion upper surface 651, a perforated edge portion upper surface 653 (which is part of the surface 651), a perforated edge portion lower surface 654 (which is part of the trailing edge portion lower surface 652, which isn't displayed), first and second perforated creases 655 and 656, a perforated edge 659, a perforated tab 638, a trailing edge portion first side surface 657, and excess material creases 768a and 768c. The trailing edge portion upper and lower surfaces 651 and 652, respectively, intersect at the perforated edge portion upper and lower surfaces 653 and 654, respectively, to generate the perforated tab 638. In other embodiments, the folded trailing edge portion may include more, fewer, and/or different components.

Figure 9A:
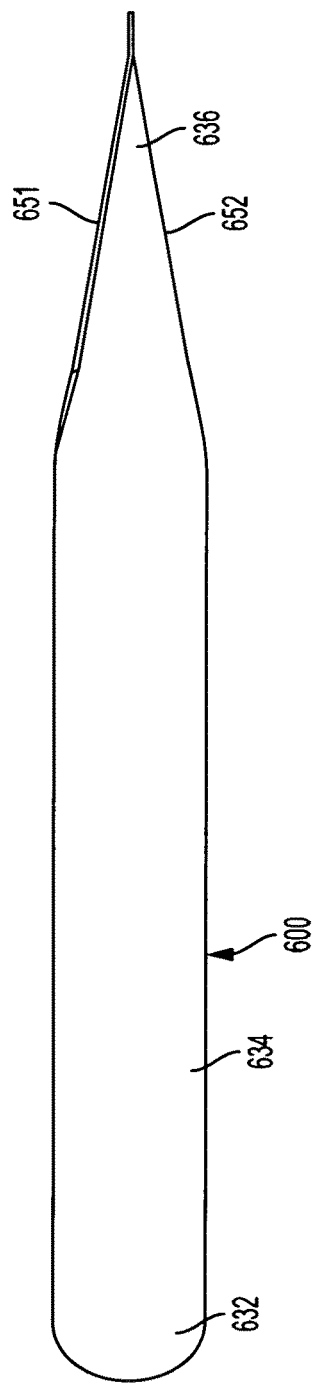
FIG. 9A illustrates a side view of a package, according to an example embodiment.

FIG. 9A displays a folded package 600 with the folded leading edge portion 632 (as opposed to the unfolded leading edge portion displayed in FIG. 8A). In FIG. 9A, the package 600 includes a leading edge portion 632, a middle portion 634, a trailing edge portion 636, a trailing edge portion upper surface 651, and a trailing edge portion lower surface 652. In FIG. 9A, the leading edge portion 632 is a rounded design because of the five leading edge surfaces (e.g., 720, 722, 724, 726, and 728, see FIG. 7) of the leading edge section 712.

Adding more leading edge surfaces to the leading edge section can result in a more rounded design, while removing leading edge surfaces from the leading edge section can result in a less rounded design of the leading edge portion 632. A rounded design may be used for leading edge portion 632 when the package 600 may be at a wide range of angles of attack during UAV flight. Alternatively, a pointed design of the leading edge portion 632 may be used when the package 600 may operate at a particular angle of attack, or a small range of angles of attack.

Figure 9B:
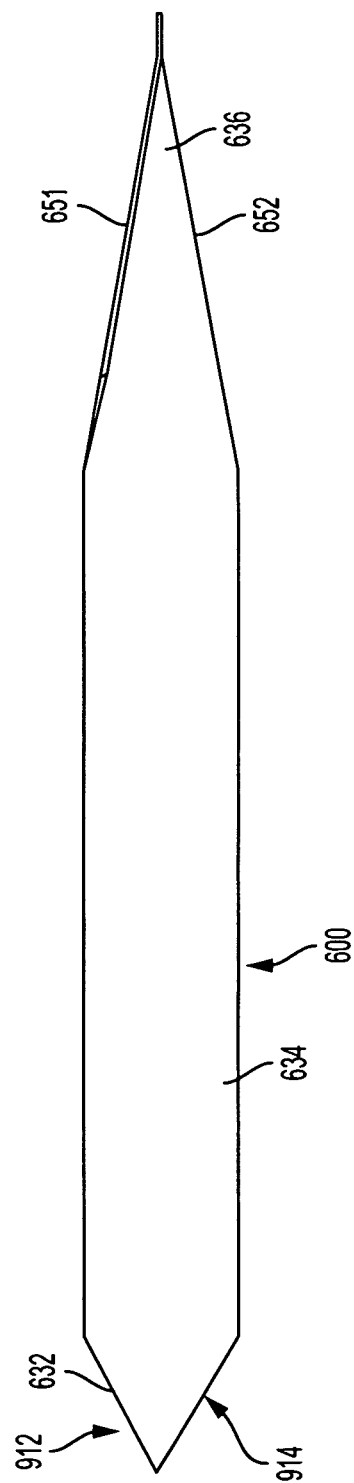
FIG. 9B illustrates a side view of an alternate design of a package, according to another example embodiment.

In FIG. 9B, an alternatives design of the leading edge portion 632 of package 600 is displayed. The package 600 includes leading edge portion 632, middle portion 634, trailing edge portion 636, trailing edge portion upper surface 651, and trailing edge portion lower surface 652. The leading edge portion 632 includes only two surfaces: leading edge portion first surface 912 and leading edge portion second surface 914. In other embodiments, the package 600 may include more, fewer, and/or different components.

The leading edge portion surfaces 912 and 914 allow the leading edge portion 632 to have a pointed design (as opposed to a rounded design). A pointed design may be more efficient at reducing drag for a particular angle of attack, and/or a small range of angles of attack. Thus, if the package 600 is expected to operate at a particular angle of attack (or a small range of angles of attack), a pointed design for the leading edge portion 632 using two leading edge surfaces 912 and 914 may be used.

The leading edge surfaces 912 and 914 may be generated from a sheet of material by folding the sheet of material along three creases. For example, the first and second creases may be folded to generate the surface 914, while the second and third creases may be folded to generate the surface 912. In other embodiments, the leading edge portion 632 of the package 600 may be generated from more leading edge surfaces from a leading edge section 712 of a sheet of material 700. Other embodiments are also possible.

Figure 10:
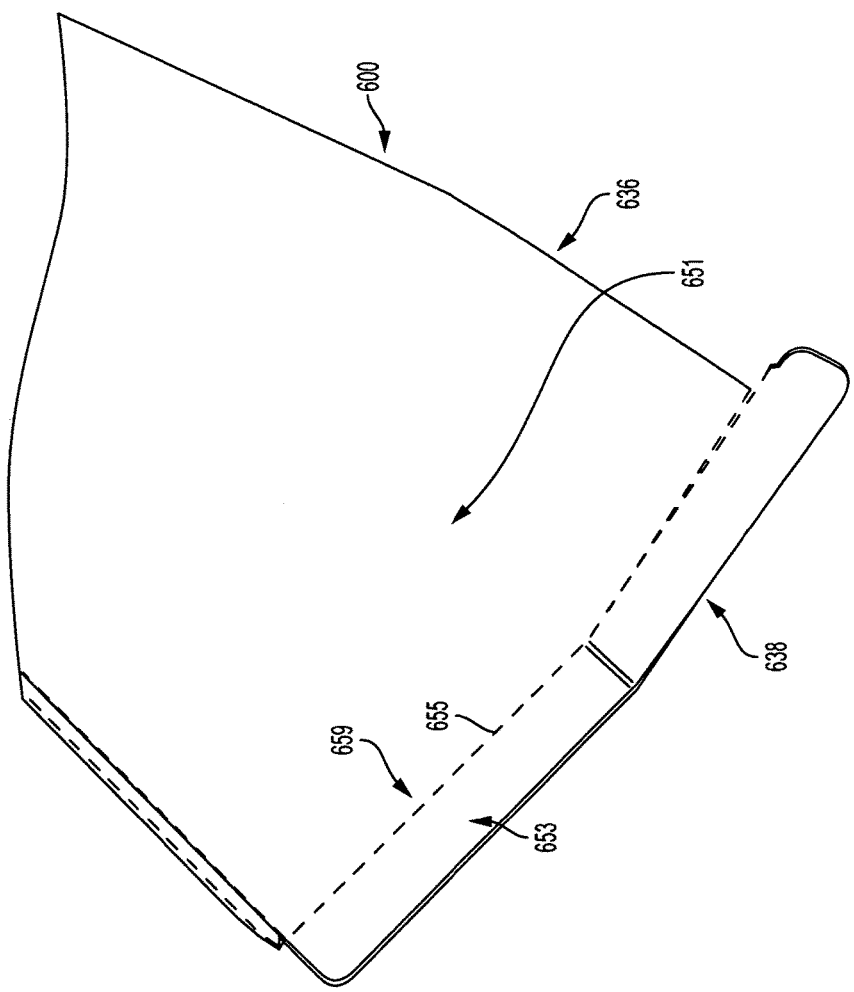
FIGS. 10 and 11 illustrate a perspective view of a package being opened, according to an example embodiment.
Figure 11:
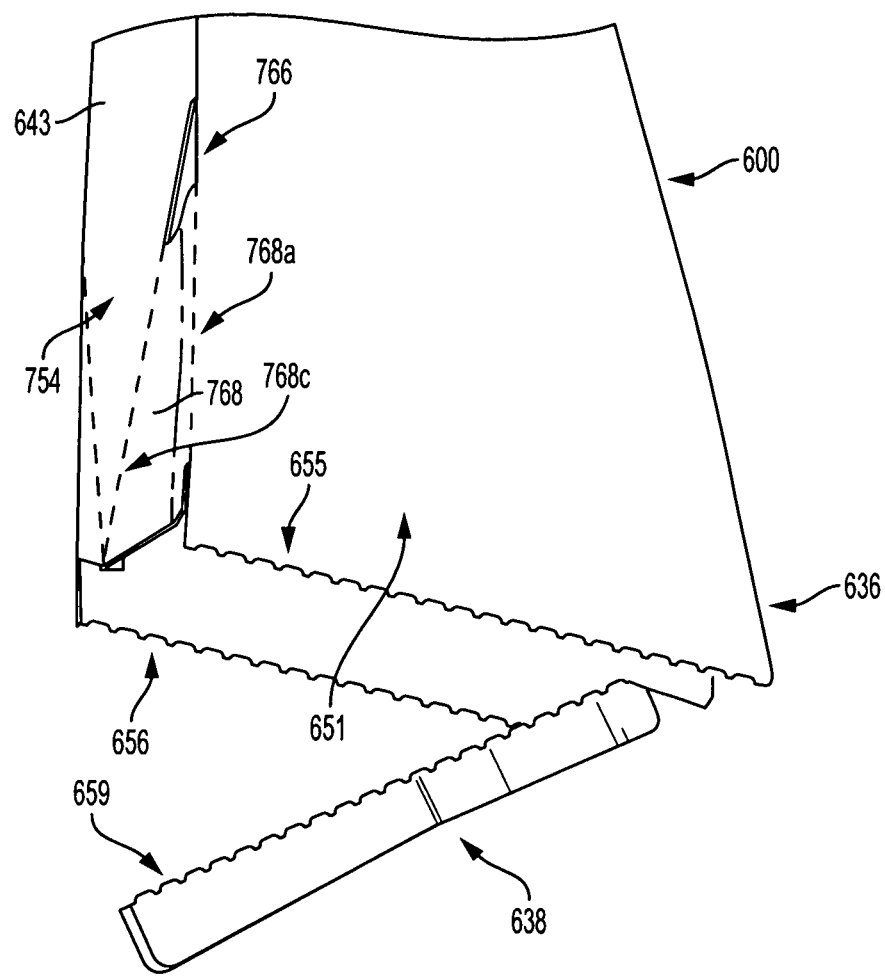

FIGS. 10 and 11 display the package 600 being opened. FIG. 10 displays a package 600 that includes a trailing edge portion 636, a perforated tab 638, a trailing edge portion upper surface 651, a perforated edge portion upper surface 653, a first perforated crease 655, and a perforated edge 659. In other embodiments, the package 600 may include more, fewer, and/or different components than those displayed in FIG. 10.

In FIG. 10, the perforated tab 638 is partially torn at the perforated edge 659 from the package 600 to open the package 600. The perforated tab 638 may include a perforated edge upper surface 653 and a perforated edge lower surface 654 (not displayed). The perforated edge 653 may include a first perforated crease 655 and a second perforated crease 656 (not displayed). Thus, when the perforated tab 638 is detached from the package 600 at the perforated edge 659, the perforated edge portion upper surface 653 may be detached from the trailing edge portion upper surface 651 at the first perforated crease 655, while the perforated edge portion lower surface 654 may be detached from the trailing edge portion lower surface 652 (not displayed) at the second perforated crease 656. Other embodiments of the perforated tab 638 and the perforated edge 659 are also possible.

The perforated tab 638 may ease opening of the package by the user while ensuring the package remains durable and sealed during UAV flight. Additionally, removing the perforated tab 638 may not require any additional materials by the user (such as tools for undoing mechanical fasteners). Furthermore, the perforated tab 638 may be an aerodynamic design featuring smooth surfaces with little frontal cross-sectional area. Thus, the perforated tab 638 may ensure that the drag on the package does not increased substantially. Also, the perforated tab 638 may be assembled easily by adhering perforated edge sections 716 and 734 (see FIG. 7) at their interior surfaces 717 and 735 using an adhesive (e.g., glue or some other material for connecting surfaces). Alternatively, the surfaces 717 and 735 may be connected using some other method (e.g., mechanical fasteners, staples, tape, tabs inserted into holes, etc.). In other embodiments of the package 600, a different mechanism from the perforated tab 638 may be used for closing and opening the package 600.

FIG. 11 displays the perforated tab 638 removed from the package 600 at the perforated edge 659 to open the package 600. In FIG. 11, the package 600 includes a trailing edge portion 636, a middle portion first side surface 643, a trailing edge portion upper surface 651, a first perforated crease 655, a second perforated crease 656, a trailing edge portion first side surface 657, excess material 768, hole 766, and excess material creases 768a and 768c. The package 600 may include more, fewer, and/or different components than those displayed in FIG. 11.

When the package 600 is opened, the excess material 768 may be allowed to unfold at excess material creases 768a, 768b (not displayed), and 768c and expand. Because the sides of the package at the trailing edge portion expand, the package can be open up at the trailing edge portion by removing the perforated tab 638 at the perforated edge 659 and pushing apart the trailing edge portion upper surface 651 and the trailing edge portion lower surface 652 (not displayed). In other embodiments of the package 600, a mechanism other than perforated tab 638 may be used to close and open the package 600.

VI. Illustrative Method(s)

Figure 12:
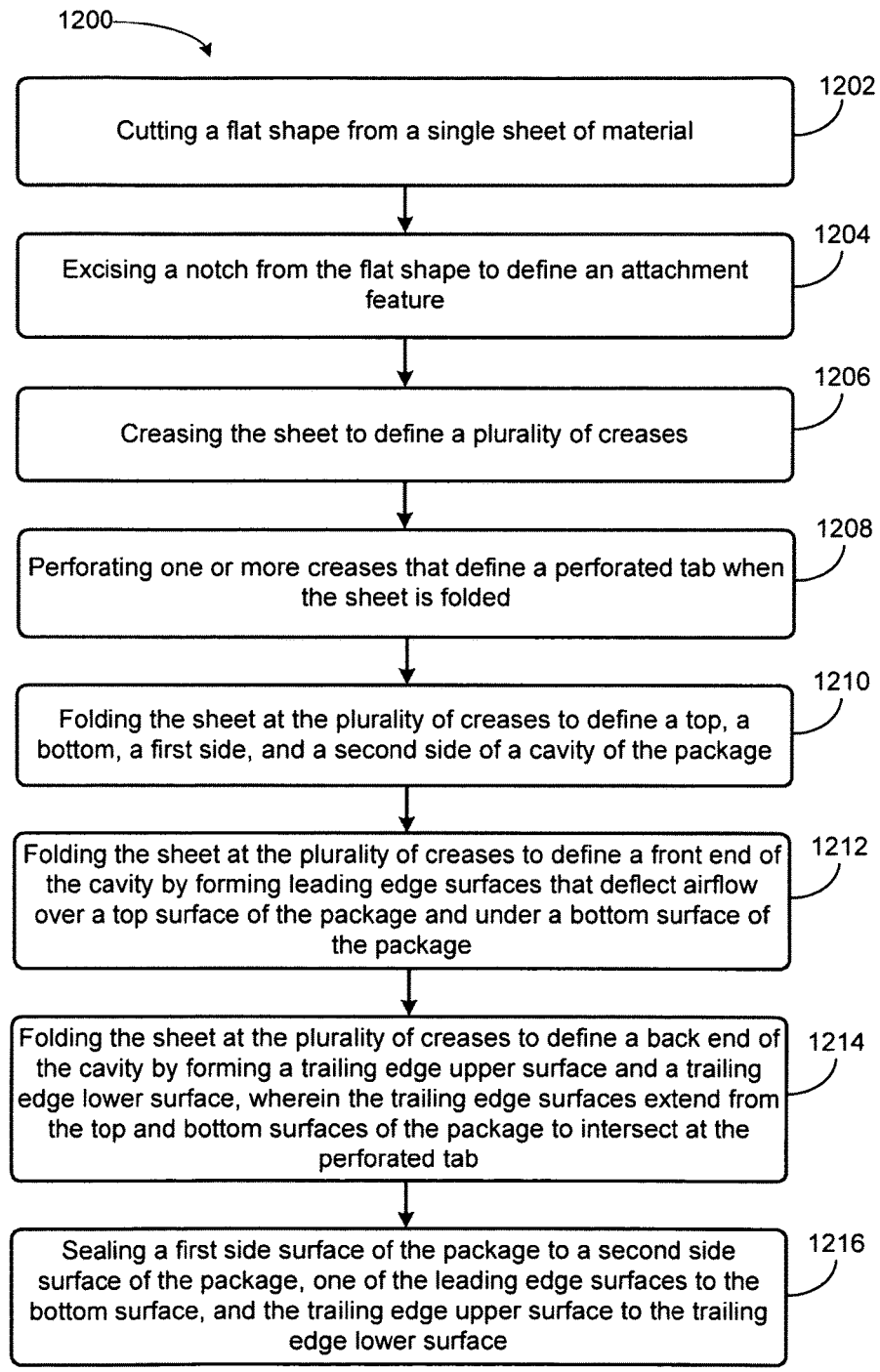
FIG. 12 illustrates a block diagram of an example method, according to an example embodiment.

FIG. 12 illustrates a flowchart showing the method 1200 that may allow for creating a package for delivering items external to a UAV by folding a sheet of material, according to an example embodiment. The method 1200 may be executed by a shipper of the package, a manufacturer of the package, an operator of the UAV, or some other entity. Method 1200 may be executed manually, by a machine, or combination of both.

Unless specifically indicated, functions in the flowchart shown in FIG. 12 may be executed out of order from that shown or discussed, including substantially concurrent execution of separately described functions, or even in reverse order in some examples, depending on the functionality involved, so long as the overall functionality of the described method is maintained. Additionally, the method 1200 may include more steps, fewer steps, and/or different steps than those displayed.

As shown by block 1202 of FIG. 12, method 1200 may involve cutting a flat shape from a single sheet of material, as shown by block 1202 of FIG. 12. In some examples, the flat shape of material may include holes, cuts, and excess material creases to prevent excess material and/or air gaps from forming when folding and/or sealing a trailing edge portion of the package. In additional examples, the flat shape may include triangle flaps that are folded to support the leading edge portion of the package. In other examples, the flat shape of the sheet of material may allow for efficient storage and/or transportation of the package and/or sheet of material.

Method 1200 may further involve excising a hole from the flat shape to define an attachment feature, as displayed by block 1204 in FIG. 12. In some examples, the attachment feature may allow the package to be attached to a pylon that is attached to the UAV. In additional examples, the attachment feature may be configured to allow the package to attach to the UAV such that the package does not create an air shadow that negatively affects the flight dynamics of the UAV by reducing lift.

Method 1200 may also involve creasing the sheet to define a plurality of creases, as can be seen in FIG. 12 by block 1206. In some examples, the creases may be creased, perforated, and/or both creased and perforated. In additional examples, the creases may permit easier folding, which may result in higher quality folds with less excess material exposed at the exterior of the package. As a result, the better folds resulting from the creases in the sheet may further reduce drag on the package during UAV flight.

Method 1200 may additionally involve perforating one or more creases that define a perforated tab when the sheet is folded, as shown by block 1208 in FIG. 12. In some examples, the perforated tab may be detached at a perforated edge from the package by a user to open the package. Thus, the perforated tab may ease opening of the package by the user while maintaining closure of the package during UAV flight.

Method 1200 may also include folding the sheet at the plurality of creases to define a top, a bottom, a first side, and a second side of the cavity of the package, as shown by block 1210 in FIG. 12. In some examples, the package may include a middle portion with the top surface, a bottom surface, a first side surface, and a second side surface. In additional examples, the surfaces of the middle portion may be smooth surfaces without air gaps or excess material exposed at the exterior of the package. As a result, the smooth surfaces of the middle portion may reduce drag on the package during UAV flight.

Method 1200 may also involve folding the sheet at the plurality of creases to define a front end of the cavity by forming leading edge surfaces that deflect airflow over a top surface of the package and under a bottom surface of the package, as shown by block 1212 in FIG. 12. In some examples, a leading edge portion of the package may have a rounded design resulting from multiple leading edge surfaces generated from folds along creases of the sheet of material. In other examples, the leading edge portion may have a pointed design resulting from fewer leading edge surfaces generated from folds along creases of the sheet of material. A rounded design may be more efficient for a larger range of angles of attack for the package, while a pointed design may be more efficient at reducing drag for a particular angle of attack, or a smaller range of angles of attack of the package.

Method 1200 may further include folding the sheet at the plurality of creases to define a back end of the cavity by forming a trailing edge upper surface and a trailing edge lower surface, wherein the trailing edge surfaces extend from the top and bottom surfaces of the package to intersect at the perforated tab, as shown by block 1214 in FIG. 12. In some examples, the trailing edge upper and lower surfaces extend from the top and bottom surfaces of the package, respectively, at an angle less than or equal to 15°. In additional examples, the trailing edge surfaces may extend from the top and bottom surfaces of the package at a low angle to prevent airflow separation from the package during UAV flight. As a result, the design of the trailing edge upper and lower surfaces allows the drag on the package to be reduced during UAV flight by preventing airflow separation.

Method 1200 may also involve sealing a side surface to the bottom surface of the package, one of the leading edge surfaces to the bottom surface, and the trailing edge upper surface to the trailing edge lower surface, as shown by block 1216 in FIG. 12. In some examples, the sealing of the various surfaces may be done by using an adhesive, such as glue or some other material for connecting the surfaces. Alternatively, some other method may be used to connect the surfaces (e.g., mechanical fasteners, staples, tape, tabs inserted into holes, etc.).

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A package that is attachable to an unmanned aerial vehicle (UAV) and formed from a foldable sheet of material, the package comprising:
a cavity formed by at least:
a top surface section, a bottom surface section, a first side surface section, a second side surface section, a leading edge section, and a trailing edge section of the foldable sheet,
wherein the leading edge section comprises one or more leading edge surfaces formed from folds along one or more creases of the foldable sheet to define a front end of the cavity, wherein the front end has a rounded shape to deflect airflow over a top surface of the package and under a bottom surface of the package during flight of the UAV,
wherein the trailing edge section comprises a trailing edge upper surface and a trailing edge lower surface formed from folds along the one or more creases of the foldable sheet, wherein the trailing edge upper and lower surfaces extend angularly from the top surface and the bottom surface of the package, respectively, and intersect to define a back end of the cavity; and
an attachment feature arranged on the top surface section of the foldable sheet.

2. The package of claim 1, wherein the trailing edge surfaces extend from the top surface and the bottom surface of the package, respectively, at an angle less than or equal to 15°.

3. The package of claim 1, wherein the trailing edge section comprises a first trailing edge side surface and a second trailing edge side surface formed from folds along the one or more creases of the foldable sheet, wherein the trailing edge section further comprises holes that reduce excess material at the first and second trailing edge side surfaces of the package.

4. The package of claim 1, wherein the first and second side surface sections comprise triangle flaps that correspond to the one or more leading edge surfaces, wherein the triangle flaps are folded to support the one or more leading edge surfaces of the package.

5. The package of claim 4, wherein the leading edge section comprises a plurality of leading edge surfaces formed from folds along a plurality of creases of the leading edge section to define the rounded shape at the front end of the cavity of the package.

6. The package of claim 1, wherein the foldable sheet of material is selected from the group consisting of paper, paperboard, and corrugated fiberboard.

7. The package of claim 1, wherein the foldable sheet includes one or more creases that indicate where to fold the sheet of material, wherein the creases may be creased, perforated, or both creased and perforated to ease folding.

8. The package of claim 1, wherein the attachment feature is configured to enable the package to attach to the UAV at the top surface of the package when the foldable sheet of material is folded.

9. The package of claim 1, wherein the trailing edge section further comprises a perforated edge upper surface and a perforated edge lower surface formed from folds along the one or more creases of the foldable sheet, wherein the perforated edge surfaces intersect at a perforated edge to further define the back end of the cavity and generate a perforated tab configured to detach from the package at the perforated edge.

10. A sheet of material foldable to form a package that is attachable to an unmanned aerial vehicle (UAV), the sheet of material comprising:
a top surface section foldable to form a top of a cavity of the package, the top surface section including an attachment feature;
a bottom surface section foldable to form a bottom of the cavity;
a first side surface section foldable to form a first side of the cavity and a second side surface section foldable to form a second side of the cavity;
a leading edge section comprising one or more leading edge surfaces formed from folds along one or more creases of the foldable sheet to define a front end of the cavity, wherein the front end has a rounded shape to deflect airflow over a top surface of the package and a under a bottom surface of the package; and
a trailing edge section comprising a trailing edge upper surface and a trailing edge lower surface formed from folds along the one or more creases of the foldable sheet, wherein the trailing edge upper and lower surfaces extend angularly from the top surface and the bottom surface of the package, respectively, and intersect to define a back end of the cavity.

11. The sheet of material of claim 10, wherein the trailing edge surfaces extend from the top surface and the bottom surface of the package, respectively, at an angle less than or equal to 15°.

12. The sheet of material of claim 10, wherein the trailing edge section comprises a first trailing edge side surface and a second trailing edge side surface formed from folds along the one or more creases of the foldable sheet, wherein the trailing edge section further comprises holes that reduce excess material at the first and second trailing edge side surfaces of the package.

13. The sheet of material of claim 10, wherein the first and second side surface sections comprise triangle flaps that correspond to the one or more leading edge surfaces, wherein the triangle flaps are folded to support the one or more leading edge surfaces of the package.

14. The sheet of material of claim 10, wherein the leading edge section comprises a plurality of leading edge surfaces formed from folds along a plurality of creases of the leading edge section to define the rounded shape at the front end of the cavity of the package.

15. The sheet of material of claim 10, wherein the foldable sheet of material is selected from the group consisting of paper, paperboard, and corrugated fiberboard.

16. The sheet of material of claim 10, wherein the foldable sheet includes one or more creases that indicate where to fold the sheet of material, wherein the creases may be creased, perforated, or both creased and perforated to ease folding.

17. The sheet of material of claim 10, wherein the attachment feature is configured to enable the package to attach to the UAV at the top surface of the package when the foldable sheet of material is folded.

18. The sheet of material of claim 10, wherein the trailing edge section further comprises a perforated edge upper surface and a perforated edge lower surface formed from folds along the one or more creases of the foldable sheet, wherein the perforated edge surfaces intersect at a perforated edge to further define the back end of the cavity and generate a perforated tab configured to detach from the package at the perforated edge.

19. A method for manufacturing a package to attach to an unmanned aerial vehicle (UAV) comprising:
- cutting a flat shape from a single sheet of material;
- excising a hole from the flat shape to define an attachment feature;
- creasing the sheet to define a plurality of creases;
- perforating one or more creases that define a perforated tab when the sheet is folded;
- folding the sheet at the plurality of creases to define a top, a bottom, a first side, and a second side of a cavity of the package;
- folding the sheet at the plurality of creases to define a front end of the cavity by forming leading edge surfaces, wherein the front end has a rounded shape to deflect airflow over a top surface of the package and under a bottom surface of the package;
- folding the sheet at the plurality of creases to define a back end of the cavity by forming a trailing edge upper surface and a trailing edge lower surface, wherein the trailing edge upper and lower surfaces extend angularly from the top and the bottom surfaces of the package, respectively, to intersect at the perforated tab; and
- sealing a side surface to the bottom surface of the package, one of the leading edge surfaces to the bottom surface, and the trailing edge upper surface to the trailing edge lower surface.

20. The method of claim 19, wherein the perforated tab can be detached to open the package after the package has been sealed closed.

* * * * *